(12) United States Patent
Hawkins et al.

(10) Patent No.: US 8,504,570 B2
(45) Date of Patent: Aug. 6, 2013

(54) AUTOMATED SEARCH FOR DETECTING PATTERNS AND SEQUENCES IN DATA USING A SPATIAL AND TEMPORAL MEMORY SYSTEM

(75) Inventors: Jeffrey C. Hawkins, Atherton, CA (US); Ronald Marianetti, II, Campbell, CA (US); Anosh Raj, Palo Alto, CA (US); Subutai Ahmad, Palo Alto, CA (US)

(73) Assignee: Numenta, Inc., Redwood City, CA (US)

( * ) Notice: Subject to any disclaimer, the term of this patent is extended or adjusted under 35 U.S.C. 154(b) by 12 days.

(21) Appl. No.: 13/218,194

(22) Filed: Aug. 25, 2011

(65) Prior Publication Data

US 2013/0054552 A1   Feb. 28, 2013

(51) Int. Cl.
*G06F 7/00* (2006.01)
*G06F 17/30* (2006.01)

(52) U.S. Cl.
USPC .......................... 707/737; 707/752; 707/748

(58) Field of Classification Search
CPC .......... G06F 17/3071; G06F 17/30864; G06F 17/30598; G06F 17/30705; G06F 17/30265
USPC ............... 707/706, 791, 778, 802, 803, 804, 707/737, 748, 752
See application file for complete search history.

(56) References Cited

U.S. PATENT DOCUMENTS

| | | | |
|---|---|---|---|
| 4,766,534 A | 8/1988 | DeBenedictis | |
| 4,845,744 A | 7/1989 | DeBenedictis | |
| 5,255,348 A | 10/1993 | Nenov | |
| 5,712,953 A | 1/1998 | Langs | |
| 5,729,661 A | 3/1998 | Keeler et al. | |
| 5,761,389 A | 6/1998 | Maeda et al. | |
| 6,028,608 A | 2/2000 | Jenkins | |
| 6,122,014 A | 9/2000 | Panusopone et al. | |
| 6,144,711 A | 11/2000 | Raleigh et al. | |
| 6,195,622 B1 | 2/2001 | Altschuler et al. | |
| 6,400,996 B1 | 6/2002 | Hoffberg et al. | |

(Continued)

FOREIGN PATENT DOCUMENTS

| | | |
|---|---|---|
| EP | 1 557 990 | 7/2005 |
| WO | WO 2006/063291 | 6/2006 |
| WO | WO 2008/067326 | 6/2008 |
| WO | WO 2009/006231 | 1/2009 |

OTHER PUBLICATIONS

Adelson, E.H. et al., "The Perception of Shading and Reflectance," *Perception as Bayesian Inference*, 1996, pp. 409-423, Knill, D.C. et al., eds., Cambridge University Press, UK.

(Continued)

*Primary Examiner* — Kimberly Wilson
*Assistant Examiner* — Hexing Liu
(74) *Attorney, Agent, or Firm* — Fenwick & West LLP

(57) ABSTRACT

A spatial and temporal memory system (STMS) processes input data to detect whether spatial patterns and/or temporal sequences of spatial patterns exist within the data, and to make predictions about future data. The data processed by the STMS may be retrieved from, for example, one or more database fields and is encoded into a distributed representation format using a coding scheme. The performance of the STMS in predicting future data is evaluated for the coding scheme used to process the data as performance data. The selection and prioritization of STMS experiments to perform may be based on the performance data for an experiment. The best fields, encodings, and time aggregations for generating predictions can be determined by an automated search and evaluation of multiple STMS systems.

23 Claims, 15 Drawing Sheets

U.S. PATENT DOCUMENTS

| | | |
|---|---|---|
| 6,468,069 B2 | 10/2002 | Lemelson et al. |
| 6,567,814 B1 | 5/2003 | Banker et al. |
| 6,615,211 B2 | 9/2003 | Beygelzimer et al. |
| 6,625,585 B1 | 9/2003 | MacCuish et al. |
| 6,714,941 B1 | 3/2004 | Lerman et al. |
| 6,751,343 B1 | 6/2004 | Ferrell et al. |
| 6,957,241 B2 | 10/2005 | George |
| 7,088,693 B2 | 8/2006 | George |
| 7,251,637 B1 | 7/2007 | Caid et al. |
| 7,613,675 B2 | 11/2009 | Hawkins et al. |
| 7,620,608 B2 | 11/2009 | Jaros et al. |
| 7,624,085 B2 | 11/2009 | Hawkins et al. |
| 7,676,458 B2 * | 3/2010 | Aggarwal et al. ............. 707/778 |
| 7,739,208 B2 | 6/2010 | George et al. |
| 7,826,990 B2 | 11/2010 | Nasle et al. |
| 7,840,395 B2 | 11/2010 | Nasle et al. |
| 7,840,396 B2 | 11/2010 | Radibratovic et al. |
| 7,844,439 B2 | 11/2010 | Nasle et al. |
| 7,844,440 B2 | 11/2010 | Nasle et al. |
| 7,899,775 B2 | 3/2011 | George et al. |
| 7,904,412 B2 | 3/2011 | Saphir et al. |
| 7,937,342 B2 | 5/2011 | George et al. |
| 7,941,389 B2 | 5/2011 | Marianetti et al. |
| 7,941,392 B2 | 5/2011 | Saphir |
| 7,983,998 B2 | 7/2011 | George et al. |
| 8,037,010 B2 | 10/2011 | Jaros et al. |
| 8,103,603 B2 | 1/2012 | George et al. |
| 8,112,367 B2 | 2/2012 | George et al. |
| 8,121,961 B2 | 2/2012 | George et al. |
| 8,175,981 B2 | 5/2012 | Hawkins et al. |
| 8,175,984 B2 | 5/2012 | George |
| 8,175,985 B2 | 5/2012 | Sayfan et al. |
| 8,195,582 B2 | 6/2012 | Niemasik et al. |
| 8,219,507 B2 | 7/2012 | Jaros et al. |
| 8,285,667 B2 | 10/2012 | Jaros et al. |
| 8,290,886 B2 | 10/2012 | George et al. |
| 2002/0002688 A1 | 1/2002 | Gregg et al. |
| 2002/0150044 A1 | 10/2002 | Wu et al. |
| 2002/0161736 A1 | 10/2002 | Beygelzimer et al. |
| 2003/0069002 A1 | 4/2003 | Hunter et al. |
| 2003/0123732 A1 | 7/2003 | Miyazaki et al. |
| 2003/0167111 A1 | 9/2003 | Kipersztok et al. |
| 2004/0002838 A1 | 1/2004 | Oliver et al. |
| 2004/0142325 A1 | 7/2004 | Mintz et al. |
| 2004/0148520 A1 | 7/2004 | Talpade et al. |
| 2004/0267395 A1 | 12/2004 | Discenzo et al. |
| 2005/0002572 A1 | 1/2005 | Saptharishi et al. |
| 2005/0028033 A1 | 2/2005 | Kipersztok et al. |
| 2005/0063565 A1 | 3/2005 | Nagaoka et al. |
| 2005/0190990 A1 | 9/2005 | Burt et al. |
| 2005/0222811 A1 | 10/2005 | Jakobson et al. |
| 2006/0093188 A1 | 5/2006 | Blake et al. |
| 2006/0161736 A1 | 7/2006 | Huang |
| 2006/0184462 A1 | 8/2006 | Hawkins |
| 2006/0212444 A1 | 9/2006 | Handman et al. |
| 2006/0235320 A1 | 10/2006 | Tan et al. |
| 2006/0248026 A1 | 11/2006 | Aoyama et al. |
| 2006/0248073 A1 | 11/2006 | Jones et al. |
| 2006/0253491 A1 | 11/2006 | Gokturk et al. |
| 2006/0259163 A1 | 11/2006 | Hsiung et al. |
| 2007/0005531 A1 | 1/2007 | George et al. |
| 2007/0019754 A1 | 1/2007 | Raleigh et al. |
| 2007/0192264 A1 | 8/2007 | Hawkins et al. |
| 2007/0192267 A1 | 8/2007 | Hawkins et al. |
| 2007/0192268 A1 | 8/2007 | Hawkins et al. |
| 2007/0192269 A1 | 8/2007 | Saphir et al. |
| 2007/0192270 A1 | 8/2007 | Hawkins et al. |
| 2007/0228703 A1 | 10/2007 | Breed |
| 2007/0276744 A1 | 11/2007 | Burke |
| 2007/0276774 A1 | 11/2007 | Ahmad et al. |
| 2008/0059389 A1 * | 3/2008 | Jaros et al. ....................... 706/12 |
| 2008/0140593 A1 * | 6/2008 | George et al. .................. 706/12 |
| 2008/0183647 A1 | 7/2008 | Hawkins et al. |
| 2008/0201286 A1 | 8/2008 | Hawkins et al. |
| 2008/0208783 A1 | 8/2008 | Jaros et al. |
| 2008/0208915 A1 | 8/2008 | George et al. |
| 2008/0208966 A1 | 8/2008 | Edwards et al. |
| 2009/0006289 A1 | 1/2009 | Jaros et al. |
| 2009/0116413 A1 | 5/2009 | George |
| 2009/0150311 A1 | 6/2009 | George |
| 2009/0240886 A1 | 9/2009 | Sayfan et al. |
| 2009/0313193 A1 * | 12/2009 | Hawkins et al. ................ 706/13 |
| 2010/0049677 A1 | 2/2010 | Jaros et al. |
| 2010/0185567 A1 | 7/2010 | Niemasik et al. |
| 2010/0191684 A1 | 7/2010 | George |
| 2010/0207754 A1 | 8/2010 | Shostak et al. |
| 2011/0225108 A1 | 9/2011 | Hawkins et al. |
| 2011/0231351 A1 | 9/2011 | George et al. |
| 2012/0005134 A1 | 1/2012 | Jaros et al. |
| 2012/0166364 A1 | 6/2012 | Ahmad et al. |
| 2012/0197823 A1 | 8/2012 | Hawkins et al. |

OTHER PUBLICATIONS

Agrawal, R. et al., "Mining Sequential Patterns," *IEEE*, 1995, pp. 3-14.

Ahmad, S. et al., "PowerNuPIC," Numenta, Jun. 2008, Numenta HTM Workshop, Jun. 23-24, 2008, SRI Campus, Menlo Park, CA, fifty-six pages.

Ahmad, S., "NuPIC Jumpstart—Part II," Numenta, May 2008, Numenta HTM Workshop, Jun. 23-24, 2008, SRI Campus, Menlo Park, CA, thirty-three pages.

Becerra, J.A. et al., "Multimodule Artificial Neural Network Architectures for Autonomous Robot Control Through Behavior Modulation," *IWANN 2003, LNCS*, pp. 169-176, vol. 2687.

Biancaniello, P. et al., Multimodal Pattern Recognition with Hierarchical Temporal Memory (MPR), Lockheed Martin Brain-Inspired Computing Research Overview, Numenta HTM Workshop, Jun. 2008, twelve pages.

Bobier, B., "Content-Based Image Retrieval Using Hierarchical Temporal Memory," Numenta HTM Workshop, Jun. 23-24, 2008, SRI Campus, Menlo Park, CA, seven pages.

Bryhni et al., "A Comparison of Load Balancing Techniques for Scalable Web Servers," *IEEE Network*, Jul./Aug. 2000, pp. 58-64.

Ceisel, A. et al., "Using HTM Networks to Decode Neural Signals from the Motor Cortex: A Novel Approach to Brain-Computer Interface Control," Illinois Institute of Technology, Numenta HTM Workshop, 2009, four pages.

Chapela, V., "Preventing Financial Fraud," Smart Security Services, Numenta HTM Workshop, 2009, forty pages.

China State Intellectual Property Office, First Office Action, Chinese Patent Application No. 200780007274.1, Jun. 24, 2011, five pages.

China State Intellectual Property Office, First Office Action, Chinese Application No. 200580042258.7, Jul. 10, 2009, twelve pages.

Colombe, J., "A Survey of Recent Developments in Theoretical Neuroscience and Machine Vision," *Proceedings of the IEEE Applied Imagery Pattern Recognition Workshop*, 2003, nine pages.

Cormack, G.V. et al., "Data Compression Using Dynamic Markov Modelling," *The Computer Journal*, 1987, pp. 541-550, vol. 30, No. 6.

Csapo, A.B. et al., "Object Categorization Using VFA-Generated Nodemaps and Hierarchical Temporal Memories," *IEEE International Conference on Computational Cybernetics*, Oct. 7, 2007, pp. 257-262.

Curry, C. et al., "Speech Processing with HTM," Numenta HTM Workshop, Jun. 23-24, 2008, SRI Campus, Menlo Park, CA, fifty-seven pages.

Dean, T., "Learning Invariant Features Using Inertial Priors," *Annals of Mathematics and Artificial Intelligence*, 2006, pp. 223-250, vol. 47.

Demeris, Y. et al., "From Motor Babbling to Hierarchical Learning by Imitation: A Robot Developmental Pathway," *Proceedings of the Fifth International Workshop on Epigenetic Robotics: Modeling Cognitive Development in Robotic Systems*, 2005, pp. 31-37.

Dimitrova, N. et al., "Motion Recovery for Video Content Classification," *ACM Transactions on Information Systems*, Oct. 1995, pp. 408-439, vol. 13, No. 4.

Ding, C.H.Q., "Cluster Merging and Splitting in Hierarchical Clustering Algorithms," *Proceedings of the 2002 IEEE International Conference on Data Mining (ICDM 2002)*, Dec. 9, 2002, pp. 139-146.

Dolin, R. et al., "Scalable Collection Summarization and Selection," *Association for Computing Machinery*, 1999, pp. 49-58.
Dubinsky, D., "Numenta Business Strategy," Numenta, Jun. 2008, Numenta HTM Workshop, Jun. 23-24, 2008, SRI Campus, Menlo Park, CA, fifteen pages.
Dudgeon, M. et al., "Evolved HTM Preprocessing," Qualia Labs, Jun. 25, 2009, nine pages.
Eastman, K. "HTM's & Airline Passenger Behavior: Prediction and Inference Model," Numenta HTM Workshop, 2009, ten pages.
EDSA, "Project Information," Apr. 2008, Numenta HTM Workshop, Jun. 23-24, 2008, SRI Campus, Menlo Park, CA, four pages.
Eswaran, K., "Numenta Lightning Talk on Dimension Reduction and Unsupervised Learning," Numenta HTM Workshop, Jun. 23-24, 2008, SRI Campus, Menlo Park, CA, thirty pages.
European Patent Office, Examination Report, European Application No. 05853611.1, Jun. 23, 2008, four pages.
European Patent Office, Examination Report, European Application No. 07750385.2, Apr. 21, 2009, eight pages.
European Patent Office, Examination Report, European Patent Application No. 08796030.8, Dec. 6, 2010, seven pages.
European Patent Office, Examination Report,, European Patent Application No. 07750385.2, Dec. 6, 2010, eight pages.
Farahmand, N. et al., "Online Temporal Pattern Learning," *Proceedings of the International Joint Conference on Neural Networks*, Jun. 14-19, 2009, pp. 797-802, Atlanta, GA, USA.
Felleman, D.J. et al., "Distributed Hierarchical Processing in the Primate Cerebral Cortex," *Cerebral Cortex*, Jan./Feb. 1991, pp. 1-47, vol. 1.
Fine, S. et al., "The Hierarchical Hidden Markov Model: Analysis and Applications," *Machine Learning*, 1998, pp. 41-62, vol. 32, Kluwer Academic Publishers, Boston.
Finley, M., "Exploration of Motion Capture," Qualia Labs, Jun. 24, 2008, Numenta HTM Workshop, Jun. 23-24, 2008, SRI Campus, Menlo Park, CA, thirty-six pages.
Foldiak, P., "Learning Invariance from Transformation Sequences," *Neural Computation*, 1991, pp. 194-200, vol. 3, No. 2.
Fukushima, K., "Neocognitron: A Self-Organizing Neural Network Model for a Mechanism of Pattern Recognition Unaffected by Shift in Position," *Biol. Cybernetics*, 1980, pp. 193-202, vol. 36.
Garalevicius, S., "Memory-Prediction Framework for Pattern Recognition: Performance and Suitability of the Bayesian Model of Visual Cortex," *American Association of Artificial Intelligence*, 2007, six pages.
George, D. "Thesis: How the Brain Might Work," Dept. of Electrical Engineering and the Committee on Graduate Studies of Stanford University, Jun. 2008, one-hundred ninety-one pages.
George, D. et al., "A Hierarchical Bayesian Model of Invariant Pattern Recognition in the Visual Cortex," Proceedings, *2005 IEEE International Joint Conference on Neural Networks*, Jul. 31-Aug. 4, 2005, pp. 1812-1817, vol. 3.
George, D. et al., "Invariant Pattern Recognition Using Bayesian Inference on Hierarchical Sequences," Technical Report, Oct. 2004, eight pages.
George, D. et al., "The HTM Learning Algorithms," Mar. 1, 2007, 44 pages. [Online] [Retrieved on Sep. 22, 2011] Retrieved from the Internet <URL:http://www.numenta.com/htm-overview/education/Numenta_HTM_Learning_Algos.pdf.>.
George, D. et al., "Towards a Mathematical Theory of Cortical Micro-circuits," *PLoS Computational Biology*, Oct. 2009, vol. 5, Issue 10, twenty-six pages.
Gottschalk, K. et al., "Introduction to Web Services Architecture," *IBM Systems Journal*, 2002, pp. 170-177, vol. 41, No. 2.
Guerrier, P., "A Generic Architecture for On-Chip Packet-Switched Interconnections," *Association for Computing Machinery*, 2000, pp. 250-256.
Guinea, D. et al., "Robot Learning to Walk: An Architectural Problem for Intelligent Controllers," *Proceedings of the 1993 International Symposium on Intelligent Control*, Aug. 1993, pp. 493-498, Chicago, USA.
Guo, C-E. et al., "Modeling Visual Patterns by Integrating Descriptive and Generative Methods," *International Journal of Computer Vision*, May 29, 2003, pp. 5-29, vol. 53, No. 1.

Haitani, R. et al., "Vitamin D Toolkit, Introduction," Jun. 24, 2008, Numenta HTM Workshop, Jun. 23-24, 2008, SRI Campus, Menlo Park, CA, eleven pages.
Haitani, R., "Smart Video: A Disruptive Market Opportunity for HTM," Numenta HTM Workshop, 2009, twelve pages.
Han, K. et al., "Automated Robot Behavior Recognition Applied to Robotic Soccer," *In Proceedings of the IJCAI-99 Workshop on Team Behaviors and Plan Recognition*, 1999, six pages.
Hartung, J. et al., "Presentation: Support for the Use of Hierarchical Temporal Memory Systems in Automated Design Evaluation: A First Experiment," Numenta HTM Workshop, 2009, thirty-one pages.
Hartung, J. et al., "Support for the Use of Hierarchical Temporal Memory Systems in Automated Design Evaluation: A First Experiment," *Proceedings of the ASME 2009 Int'l. Design Engineering Technical Conferences & Computers and Information in Engineering Conference*, Aug. 30-Sep. 2, 2009, ten pages, San Diego, CA, USA.
Hasegawa, Y. et al., "Learning Method for Hierarchical Behavior Controller," *Proceedings of the 1999 IEEE International Conference on Robotics & Automation*, May 1999, pp. 2799-2804.
Hawkins, J. "Hierarchical Temporal Memory: History-Progress-Today-Tomorrow," HTM Workshop, Jun. 2009, twenty-four pages.
Hawkins, J. "Prediction Toolkit Overview," Numenta HTM Workshop, 2009, four pages.
Hawkins, J. et al., "Hierarchical Temporal Memory: Concepts, Theory and Terminology," Numenta, Inc., Mar. 27, 2007, 20 pages. [Online] [Retrieved on Sep. 22, 2011] Retrieved from the Internet<URL:http://www.numenta.com/htm-overview/education/Numenta_HTM_Concepts.pdf.>.
Hawkins, J. et al., "On Intelligence," Sep. 2004, Times Books, Henry Holt and Company, New York, NY 10011.
Hawkins, J. et al., "Sequence Memory for Prediction, Inference and Behaviour," *Philosophical Transactions of The Royal Society B*, Mar. 31, 2009, pp. 1203-1209, vol. 364. [Online] [Retrieved Sep. 22, 2011] Retrieved from the Internet <URL:http://rstb.royalsocietypublishing.org/content/364/1521/1203.full.pdf.>.
Hawkins, J., "Why Can't a Computer Be More Like a Brain?" *IEEE Spectrum*, Apr. 1, 2007, pp. 21-26, vol. 44, No. 4.
Hernandez-Gardiol, N. et al., "Hierarchical Memory-Based Reinforcement Learning," *Proceedings of Neural Information Processing Systems*, 2001, seven pages.
Hinton, G.E. et al., "The "Wake-Sleep"Algorithm for Unsupervised Neural Networks," *Science*, May 26, 1995, pp. 1158-1161, vol. 268.
Hoey, "Hierarchical unsupervised learning of facial expression categories," *IEEE*, 2001, 0-7695-1293-3, pp. 99-106.
Hyvarinen, A. et al., "Bubbles: A Unifying Framework for Low-Level Statistical Properties of Natural Image Sequences," *J. Opt. Soc. Am. A.*, 2003, pp. 1237-1252, vol. 20, No. 7.
Isard, M. et al., "ICONDENSATION: Unifying Low-Level and High-Level Tracking in a Stochastic Framework," *Lecture Notes in Computer Science 1406*, 1998, pp. 893-908, Burkhardt, H. et al., ed., Springer-Verlag, Berlin.
Kim, J. et al., "Hierarchical Distributed Genetic Algorithms: A Fuzzy Logic Controller Design Application," *IEEE Expert*, Jun. 1996, pp. 76-84.
Kuenzer, A. et al., "An Empirical Study of Dynamic Bayesian Networks for User Modeling," *Proceedings of the UM 2001 Workshop on Machine Learning*, ten pages.
Lee, T.S. et al., "Hierarchical Bayesian Inference in the Visual Cortex," *J. Opt. Soc. Am. A. Opt. Image. Sci. Vis.*, Jul. 2003, pp. 1434-1448, vol. 20, No. 7.
Lenser, S. et al., "A Modular Hierarchical Behavior-Based Architecture," *RoboCup 2001, LNAI 2377*, 2002, pp. 423-428, Birk, A. et al, (eds.), Springer-Verlag, Berlin, Heidelberg.
Levinson, S. et al., "Automatic Language Acquisition for a Mobile Robot," Feb. 2005, Numenta HTM Workshop, Jun. 23-24, 2008, SRI Campus, Menlo Park, CA, twenty-seven pages.
Lewicki, M.S. et al., "Bayesian Unsupervised Learning of Higher Order Structure," *Proceedings of the 1996 Conference in Advances in Neural Information Processing Systems 9*, pp. 529-535.
Lim, "Estimation of Occlusion and Dense Motion Fields in a Bidirectional Bayesian Framework," *IEEE Transactions on Pattern Analysis and Machine Intelligence*, 2002, pp. 712-718, vol. 24, No. 5.

Lo, J. "Unsupervised Hebbian Learning by Recurrent Multilayer Neural Networks for Temporal Hierarchical Pattern Recognition," *Information Sciences and Systems 44th Annual Conference on Digital Object Identifier*, 2010, pp. 1-6.

Majure, L., "Unsupervised Phoneme Acquisition Using HTM," Jun. 25, 2009, eight pages.

Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.

Mari, J.-F. et al., "Temporal and Spatial Data Mining with Second-Order Hidden Markov Models," *Soft Computing—A Fusion of Foundations, Methodologies and Applications*, 2006, pp. 406-414, vol. 10, No. 5.

McDowell, C. et al., "SlugGo, a Computer Go Program," Numenta HTM Workshop, Jun. 23-24, 2008, SRI Campus, Menlo Park, CA, eighteen pages.

Miller, J. W. et al., "Biomimetic Sensory Abstraction Using Hierarchical Quilted Self-Organizing Maps," *Society of Photo-Optical Instrumentation Engineers*, 2006, eleven pages.

Mishkin, M. et al., "Hierarchical Organization of Cognitive Memory," *Phil. Trans. R. Soc. B.*, 1997, pp. 1461-1467, London.

Mitrovic, A., "An Intelligent SQL Tutor on the Web," *International Journal of Artificial Intelligence in Education*, 2003, pp. 171-195, vol. 13.

Muckli, L., "Predictive Coding in Apparent Motion," University of Glasgow, Numenta HTM Workshop, Jun. 25 2009, twelve pages.

Murphy, K. et al., "Using the Forest to See the Trees: A Graphical Model Relating Features, Objects and Scenes,"*Advances in Neural Processing System*, 2004, vol. 16, eight pages.

Murray, S.O. et al., "Shaper Perception Reduces Activity in Human Primary Visual Cortex," *Proceedings of the Nat. Acad. of Sciences of the USA*, Nov. 2002, pp. 15164-151169, vol. 99, No. 23.

Nair, D. et al., "Bayesian Recognition of Targets by Parts in Second Generation Forward Looking Infrared Images," *Image and Vision Computing*, 2000, pp. 849-864, vol. 18.

Namphol, A. et al., "Image Compression with a Hierarchical Neural Network," *IEEE transactions on Aerospace and Electronic Systems*, Jan. 1996, pp. 326-338, vol. 32, No. 1.

Naphade, M. et al., "A Probabilistic Framework for Semantic Video Indexing, Filtering, and Retrieval," *IEEE Transactions on Multimedia*, Mar. 2001, pp. 141-151, vol. 3, No. 1.

Niemasik, J. "Vision Toolkit," Numenta HTM Workshop, 2009, twenty-eight pages.

Numenta, Inc., "Business Strategy," Numenta HTM Workshop, 2009, fifteen pages.

Numenta, Inc., "Hierarchical Temporal Memory including HTM Cortical Learning Algorithms, Version 0.2.1," Sep. 12, 2011, sixty-eight pages. [Online] [Retrieved Sep. 22, 2011] Retrieved from the Internet <URL:http://www.numenta.com/htm-overview/education/HTM_CorticalLearningAlgorithms.pdf.>.

Numenta, Inc., "Hierarchical Temporal Memory: Comparison with Existing Models, Version 1.01," Mar. 1, 2007, four pages.

Numenta, Inc., "HTM Algorithms," Jun. 2008, Numenta HTM Workshop, Jun. 23-24, 2008, SRI Campus, Menlo Park, CA, sixty-seven pages.

Numenta, Inc., "HTM Workshop, Jumpstart," Jun. 2008, Numenta HTM Workshop, Jun. 23-24, 2008, SRI Campus, Menlo Park, CA, eighty-six pages.

Numenta, Inc., "Numenta Node Algorithms Guide NuPIC 1.6," Numenta, Jul. 22, 2008, pp. 1-7.

Numenta, Inc., "Numenta Node Algorithms Guide NuPIC 1.6," Numenta, Jun. 13, 2008, pp. 1-6.

Numenta, Inc., "Numenta Platform for Intelligent Computing: Programmer's Guide Version 1.0," Mar. 2007, seventy-seven pages.

Numenta, Inc., "NuPIC Update," Numenta HTM Workshop, 2009, twenty-four pages.

Numenta, Inc., "Problem Solving with HTMs," Jun. 2008, Numenta HTM Workshop, Jun. 23-24, 2008, SRI Campus, Menlo Park, CA, twenty-three pages.

Numenta, Inc., "Prototype to Demonstrate Automated Insect Detection and Discrimination," Numenta HTM Workshop, 2009, four pages.

Numenta, Inc., "Smart Music: Combining Musical Expectations with Algorithmic Composition," Numenta HTM Workshop, 2009, seven pages.

Numenta, Inc., "Technical Keynote," Numenta HTM Workshop, 2009, seventy-two pages.

Numenta, Inc., "Temporal Model Characteristics," Numenta HTM Workshop, 2009, fourteen pages.

C100 Numenta, Inc., "Vision Framework," Jun. 2008, Numenta HTM Workshop, Jun. 23-24, 2008, SRI Campus, Menlo Park, CA, thirty-six pages.

Numenta, Inc., "What Have We Worked on Since the 2008 Workshop? Customer Applications Presentation," Numenta HTM Workshop, 2009, thirty-five pages.

Numenta, Inc., "Zeta1 Algorithms Reference, Version 1.0," Numenta Inc., Mar. 1, 2007, pp. 1-36.

Numenta, Inc., "Zeta1 Algorithms Reference, Version 1.2," Numenta Inc., Jun. 8, 2007, pp. 1-38.

Numenta, Inc., "Zeta1 Algorithms Reference, Version 1.3," Numenta Inc., Aug. 22, 2007, pp. 1-41.

Numenta, Inc., "Zeta1 Algorithms Reference, Version 1.5," Numenta Inc., Aug. 24, 2007, pp. 1-45.

Olshausen, B.A. et al., "A Neurobiological Model of Visual Attention and Invariant Pattern Recognition Based on Dynamic Routing Information," *Journal of Neuroscience*, Nov. 1993, pp. 4700-4719, vol. 13, No. 11.

Park, S. et al., "Recognition of Two-person Interactions Using a Hierarchical Bayesian Network," *ACM SIGMM International Workshop on Video Surveillance (IWVS) 2003*, pp. 65-76, Berkeley, USA.

PCT International Search Report and Written Opinion, PCT Application No. PCT/US2005/044729, May 14, 2007, twelve pages.

PCT International Search Report and Written Opinion, PCT Application No. PCT/US2007/003544, Jun. 16, 2008, ten pages.

PCT International Search Report and Written Opinion, PCT Application No. PCT/US07/85661, Jun. 13, 2008, six pages.

PCT International Search Report and Written Opinion, PCT Application No. PCT/US08/55389, Jul. 25, 2008, seven pages.

PCT International Search Report and Written Opinion, PCT Application No. PCT/US08/55352, Aug. 1, 2008, seven pages.

PCT International Search Report and Written Opinion, PCT Application No. PCT/US2008/054631, Aug. 18, 2008, twelve pages.

PCT International Search Report and Written Opinion, PCT Application No. PCT/US2008/068435, Oct. 31, 2008, eleven pages.

PCT International Search Report and Written Opinion, PCT Application No. PCT/US2009/035193, Apr. 22, 2009, eleven pages.

PCT International Search Report and Written Opinion, PCT Application No. PCT/US2011/028231, May 19, 2011, nine pages.

PCT International Search Report and Written Opinion, PCT Application No. PCT/US2009/047250, Sep. 25, 2009, twelve pages.

PCT International Search Report and Written Opinion, PCT Application No. PCT/US2008/080347, Dec. 10, 2008, six pages.

Pearl, J., "Probabilistic Reasoning in Intelligent Systems: Networks of Plausible Inference," 1988, pp. 143-223, Morgan Kaufmann Publishers, Inc.

Poppel, E., "A Hierarchical Model of Temporal Perception," *Trends in Cognitive Sciences*, May 1997, pp. 56-61, vol. 1, No. 2.

Rao, R. et al., "Predictive Coding in the Visual Cortex: A Functional Interpretation of Some Extra-classical Receptive-field Effects," *Nature Neuroscience*, Jan. 1999, pp. 79-87, vol. 2, No. 1.

Riesenhuber, M. et al., "Hierarchical Models of Object Recognition in Cortex," *Nature Neuroscience*, Nov. 1999, pp. 1019-1025, vol. 2, No. 11.

Ross, L., "Discovering and Using Patterns in Plant Floor Data," Numenta HTM Workshop, Jun. 23-24, 2008, SRI Campus, Menlo Park, CA, twelve pages.

Saphir, B. "Numenta Web Services," Numenta HTM Workshop, 2009, twenty pages.

Saphir, B., "Power NuPIC Part II, How to Create a New Node Type," Numenta, Jun. 2008, Numenta HTM Workshop, Jun. 23-24, 2008, SRI Campus, Menlo Park, CA, thirty-two pages.

SDSYSTEM24.COM, "HTM Optimized Drug Therapy," Numenta HTM Workshop, Jun. 23-24, 2008, SRI Campus, Menlo Park, CA, seven pages.

Sinha, P. et al., "Recovering Reflectance and Illumination in a World of Painted Polyhedra," *Fourth International Conference on Computer Vision*, Berlin, May 11-14, 1993, pp. 156-163, IEEE Computer Society Press, Los Alamitos, CA.
Spence, C. et al., "Varying Complexity in Tree-Structured Image Distribution Models," *IEEE Transactions on Image Processing*, Feb. 2006, pp. 319-330, vol. 15, No. 2.
Starzyk, J.A. et al., "Spatio-Temporal Memories for Machine Learning: A Long-Term Memory Organization," *IEEE Transactions on Neural Networks*, May 2009, pp. 768-780, vol. 20, No. 5.
Stringer, S.M. et al., "Invariant Object Recognition in the Visual System with Novel Views of 3D Objects," *Neural Computation*, Nov. 2002, pp. 2585-2596, vol. 14, No. 11.
Sudderth, E.B. et al., "Nonparametric Belief Propagation and Facial Appearance Estimation," Al Memo 2002-020, Dec. 2002, Artificial Intelligence Laboratory, Massachusetts Institute of Technology, Cambridge, MA, USA, eleven pages.
Thomson, A.M. et al., "Interlaminar Connections in the Neocortex," *Cerebral Cortex*, 2003, pp. 5-14, vol. 13, No. 1.
Thornton, J. et al., "Robust Character Recognition Using a Hierarchical Bayesian Network," *Proceedings of the 19th Australian Joint Conference on Artifical Intelligence*, 2006, pp. 1259-1264.
Tsinarakis, G.J. et al. "Modular Petri Net Based Modeling, Analysis and Synthesis of Dedicated Production Systems," *Proceedings of the 2003 IEEE International Conference on Robotics and Automation*, Sep. 14-19, 2003, pp. 3559-3564, Taipei, Taiwan.
Tsinarakis, G.J. et al. "Modular Petri Net Based Modeling, Analysis, Synthesis and Performance Evaluation of Random Topology Dedicated Production Systems," *Journal of Intelligent Manufacturing*, 2005, vol. 16, pp. 67-92.
Tsukada, M, "A Theoretical Model of the Hippocampal-Cortical Memory System Motivated by Physiological Functions in the Hippocampus", *Proceedings of the 1993 International Joint Conference on Neural Networks*, Oct. 25, 1993, pp. 1120-1123, vol. 2.
U.S. Office Action, U.S. Appl. No. 11/010,243, Jul. 12, 2007, twelve pages.
U.S. Office Action, U.S. Appl. No. 11/147,069, Jan. 9, 2007, twenty-seven pages.
U.S. Office Action, U.S. Appl. No. 11/147,069, Jan. 9, 2009, thirty-eight pages.
U.S. Office Action, U.S. Application No. 11/147,069, Jul. 29, 2009, forty-three pages.
U.S. Office Action, U.S. Appl. No. 11/147,069, May 15, 2008, thirty-seven pages.
U.S. Office Action, U.S. Appl. No. 11/147,069, May 29, 2007, thirty-six pages.
U.S. Office Action, U.S. Appl. No. 11/147,069, Oct. 30, 2007, thirty-four pages.
U.S. Office Action, U.S. Appl. No. 11/351,437, Aug. 23, 2007, sixteen pages.
U.S. Office Action, U.S. Appl. No. 11/351,437, Feb. 20, 2008, six pages.
U.S. Office Action, U.S. Appl. No. 11/622,447, May 28, 2008, eighteen pages.
U.S. Office Action, U.S. Appl. No. 11/622,448, Apr. 30, 2008, seventeen pages.
U.S. Office Action, U.S. Appl. No. 11/622,448, Aug. 24, 2007, nineteen pages.
U.S. Office Action, U.S. Appl. No. 11/622,454, Jun. 3, 2008, thirteen pages.
U.S. Office Action, U.S. Appl. No. 11/622,454, Mar. 30, 2009, eleven pages.
U.S. Office Action, U.S. Appl. No. 11/622,455, Apr. 21, 2010, twelve pages.
U.S. Office Action, U.S. Appl. No. 11/622,456, Mar. 20, 2009, nine pages.
U.S. Office Action, U.S. Appl. No. 11/622,456, May 7, 2008, fourteen pages.
U.S. Office Action, U.S. Appl. No. 11/622,456, Nov. 6, 2008, seven pages.
U.S. Office Action, U.S. Appl. No. 11/622,457, Apr. 21, 2009, six pages.
U.S. Office Action, U.S. Appl. No. 11/622,457, Aug. 24, 2007, ten pages.
U.S. Office Action, U.S. Appl. No. 11/622,457, May 6, 2008, fourteen pages.
U.S. Office Action, U.S. Appl. No. 11/622,457, Nov. 20, 2008, eight pages.
U.S. Office Action, U.S. Appl. No. 11/622,458, Apr. 1, 2010, sixteen pages.
U.S. Office Action, U.S. Appl. No. 11/680,197, Mar. 23, 2010, twelve pages.
U.S. Office Action, U.S. Appl. No. 11/680,197, Sep. 14, 2010, seventeen pages.
U.S. Office Action, U.S. Appl. No. 11/713,157, Mar. 31, 2010, fourteen pages.
U.S. Office Action, U.S. Appl. No. 11/945,919, Sep. 7, 2010, nineteen pages.
U.S. Office Action, U.S. Appl. No. 12/029,434, Mar. 28, 2011, twenty-four pages.
U.S. Office Action, U.S. Appl. No. 12/039,630, Nov. 24, 2010, ten pages.
U.S. Office Action, U.S. Appl. No. 12/039,652, Mar. 29, 2011, fifteen pages.
U.S. Office Action, U.S. Appl. No. 12/040,849, Feb. 3, 2011, thirteen pages.
U.S. Office Action, U.S. Appl. No. 12/040,849, Jul. 1, 2011, eighteen pages.
U.S. Office Action, U.S. Appl. No. 12/147,348, Oct. 11, 2011, forty-three pages.
U.S. Office Action, U.S. Appl. No. 12/288,185, Sep. 15, 2010, eleven pages.
U.S. Office Action, U.S. Appl. No. 12/751,808, Oct. 28, 2010, thirteen pages.
U.S. Office Action, U.S. Appl. No. 13/151,928, Aug. 2, 2011, eight pages.
U.S. Appl. No. 13,218,170, filed Aug. 25, 2011.
U.S. Appl. No. 13,218,202, filed Aug. 25, 2011.
U.S. Appl. No. 13,227,355, filed Sep. 7, 2011.
Van Essen, D.C. et al., "Information Processing Strategies and Pathways in the Primate Visual System," *An Introduction to Neural and Electronic Networks*, 1995, pp. 45-76.
Vaught, T.N., "Software Design in Scientific Computing," Jun. 23, 2008, Numenta HTM Workshop, Jun. 23-24, 2008, SRI Campus, Menlo Park, CA, thirty-two pages.
Vlajic, "Vector Quantization of Images Using Modified Adaptive Resonance Algorithm for Hierarchical Clustering," *IEEE Transactions on Neural Networks*, 2001, pp. 1147-1162, vol. 12, No. 5.
Weiss, R. et al., "HyPursuit: A Hierarchical Network Search Engine that Exploits Content-Link Hypertext Clustering," *Proceedings of the Seventh Annual ACM Conference on Hypertext*, Mar. 16-20, 1996, pp. 180-193, Washington, D.C., USA.
Wiskott, L. et al., "Slow Feature Analysis: Unsupervised Learning of Invariances," *Neural Computation*, 2002, pp. 715-770, vol. 14, No. 4.
Wu, G. et al., "Multi-camera Spatio-temporal Fusion and Biased Sequence-data Learning for Security Surveillance," *Association for Computing Machinery*, 2003, pp. 528-538.
Yedidia, J.S. et al., "Understanding Belief Propagation and its Generalizations," *Joint Conference on Artificial Intelligence (IJCAI 2001)*, Aug. 4-10, 2001, Seattle, WA, USA, thirty-five pages.
Zemel, R.S., "Cortical Belief Networks," *Computational Models for Neuroscience*, 2003, pp. 267-287, Hecht-Nielsen, R. et al., eds., Springer-Verlag, New York.
Hawkins, J. et al., "Hierarchical Temporal Memory, Concepts, Theory, and Terminology," Numenta, May 10, 2006, pp. 1-19.
Rojas, R., "Neural Networks, A Systematic Approach," Springer-Verlag, 1996, pp. 20-21, 110-112 and 311-319.
U.S. Appl. No. 13/333,865, filed Dec. 21, 2011.
Archive of "Numenta Platform for Intelligent Computing Programmer's Guide," Numenta, Mar. 7, 2007, pp. 1-186, www.numenta.com, [Online] Archived by http://archive.org on Mar. 19, 2007; Retrieved on Aug. 13, 2008. Retrieved from the Internet<URL:http://web.archive.org/web/20070319232606/http://www.numenta.com/for-developers/softare/pdf/nupic_prog_guide.pdf>.

George, D. et al., "A Hierarchical Bayesian Model of Invariant Pattern Recognition in the Visual Cortex," Mar. 2005.

George, D. et al., "Invariant Pattern Recognition Using Bayesian Inference on Hierarchical Sequences," Technical Report, Sep. 17, 2004, pp. 1-8.

Hawkins, J. et al., "Hierarchical Temporal Memory, Concepts, Theory, and Terminology," Numenta, Jan. 27, 2007, pp. 1-20.

Hawkins, J. et al., "Hierarchical Temporal Memory: Concepts, Theory and Terminology," Numenta, Mar. 27, 2007, [Online] [Retrieved on Oct. 7, 2008] Retrieved from the Internet<URL:http://www.numenta.com/Numenta_HTM_Concepts.pdf>.

Hawkins, J. et al., "Hierarchical Temporal Memory: Concepts, Theory and Terminology," Numenta, May 10, 2006, [Online] [Retrieved on Oct. 7, 2008] Retrieved from the Internet<URL:http://www.numenta.com/Numenta_HTM_Concepts.pdf>.

"HTM Algorithms," Numenta®, Jun. 2008, Numenta HTM Workshop, Jun. 23-24, 2008, SRI Campus, Menlo Park, CA, 67 pages.

"HTM Optimized Drug Therapy," SDSystem24.com, Numenta HTM Workshop, Jun. 2324, 2008, SRI Campus, Menlo Park, CA 7 pages.

"HTM Workshop, Jumpstart," Numenta®, Jun. 2008, Numenta HTM Workshop, Jun. 23-24, 2008, SRI Campus, Menlo Park, 86 pages.

"Problem Solving with HTMs," Numenta®, Jun. 2008, Numenta HTM Workshop, Jun. 23-24, 2008, SRI Campus, Menlo Park, CA, 23 pages.

U.S. Office Action, U.S. Appl. No. 12/029,434, Nov. 8, 2011, thirty-six pages.

U.S. Office Action, U.S. Appl. No. 13/227,355, May 25, 2012, twenty-four pages.

U.S. Office Action, U.S. Appl. No. 13/333,865, May 16, 2012, twenty-four pages.

U.S. Office Action, U.S. Appl. No. 12/483,642, Aug. 10, 2012, seven pages.

U.S. Office Action, U.S. Appl. No. 12/483,642, Apr. 26, 2012, twelve pages.

U.S. Appl. No. 13/415,713, filed Mar. 8, 2012.

U.S. Appl. No. 13/604,543, Sep. 5, 2012.

U.S. Appl. No. 12/029434, filed Feb. 11, 2008.

"Vision Framework," Numenta®, Jun. 2008, Numenta HTM Workshop, Jun. 23-24, 2008, SRI Campus, Menlo Park, CA 36 pages.

\* cited by examiner

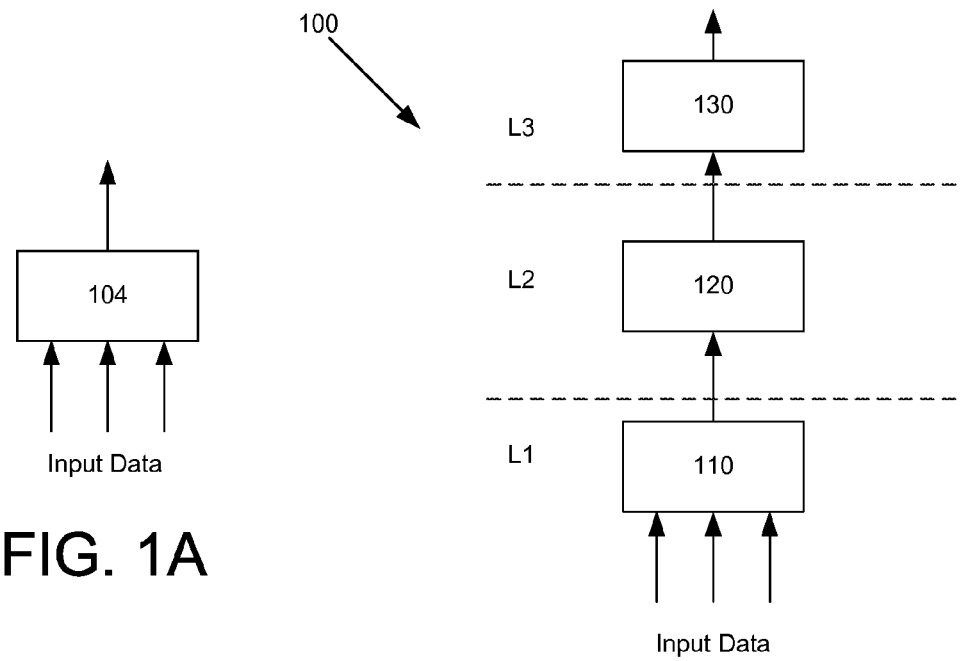
FIG. 1A
FIG. 1B
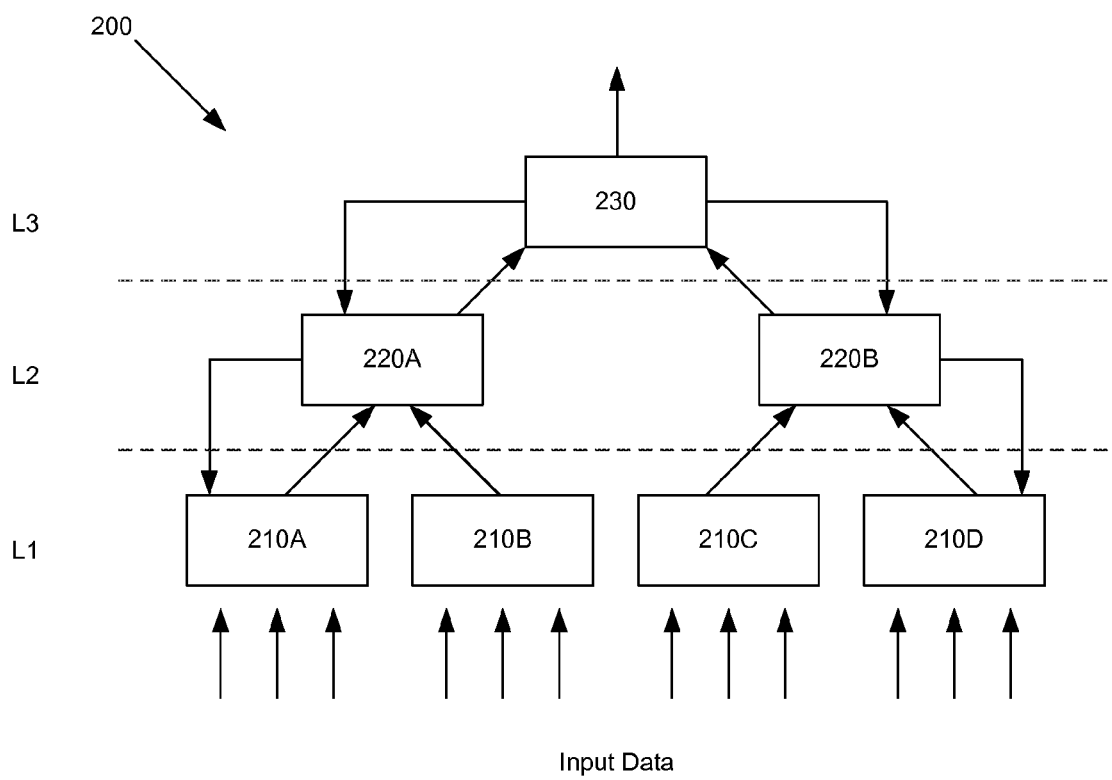
FIG. 2

AUTOMATED SEARCH FOR DETECTING PATTERNS AND SEQUENCES IN DATA USING A SPATIAL AND TEMPORAL MEMORY SYSTEM

RELATED APPLICATIONS

This application is related to U.S. patent application Ser. No. 13/218,170, entitled "Encoding of Data for Processing in A Spatial and Temporal Memory System", filed Aug. 25, 2011; U.S. patent application Ser. No. 13/218,202, entitled "Assessing Performance in A Spatial and Temporal Memory System", filed Aug. 25, 2011; and U.S. patent application Ser. No. 13/046,464, entitled "Temporal Memory Using Sparse Distributed Representation", filed Mar. 11, 2011. All of the foregoing applications are incorporated herein in their entirety by reference for all purposes.

BACKGROUND

1. Field of the Disclosure

The present invention relates to spatial and temporal memory system processing, and more specifically to automatically searching for spatial patterns and temporal sequences of spatial patterns using multiple configurations of a machine learning system.

2. Description of the Related Arts

Predictive analytics refers to a variety of techniques for modeling and data mining current and past data sets to make predictions. Predictive analytics allows for the generation of predictive models by identifying patterns in the data sets. Generally, the predictive models establish relationships or correlations between various data fields in the data sets. Using the predictive models, a user can predict the outcome or characteristics of a transaction or event based on available data. For example, predictive models for credit scoring in financial services factor in a customer's credit history and data to predict the likeliness that the customer will default on a loan.

Commercially available products for predictive analytics include products from IBM SSPS, KXEN, FICO, TIBCO, Portrait, Angoss, and Predixion Software, just to name a few. These software products use one or more statistical techniques such as regression models, discrete choice models, time series models and other machine learning techniques to generate useful predictive models. However, most of these software products are complex to use, often requiring weeks of training, mathematical expertise and complex data management. Hence, generating a useful predictive model is a daunting and expensive task for many enterprises.

Most predictive analytics products come with a toolbox of mathematical techniques that the user can choose to apply to the data sets. Depending on which techniques the user applies and how the data sets are encoded, these predictive analytic products may or may not yield use predictions. Determining the techniques to apply and the coding scheme used by a machine learning system is important to optimize the effectiveness of the machine learning system.

SUMMARY

Embodiments relate to a method and system for encoding data. Data is retrieved from one or more fields of data in one or more data sources, such as a database. The data in each field is encoded into a distributed representation format. Spatial patterns and temporal sequences of spatial patterns in the encoded input data may be identified by a spatial and temporal memory system's processing node. Predictions of future spatial patterns in the encoded input data may be made by the spatial and temporal memory system based on the identified spatial patterns and temporal sequences of spatial patterns in the encoded input data.

Embodiments relate to a method and system for evaluating the predictive performance of a spatial and temporal memory system. A spatial and temporal memory system output is generated in response to receiving input data representing a spatial pattern at a first time. The spatial and temporal memory system output includes a prediction of input data representing a spatial pattern at a second time subsequent to the first time or a prediction of a missing piece of information when other parts are known. Input data representing a spatial pattern at the second time is received. The performance of the spatial and temporal memory system is evaluated by comparing the prediction of the input data representing a spatial pattern at the second time with the received input data representing a spatial pattern at the second time.

Embodiments relate to a method and system for searching for temporal sequences of spatial patterns in data or for spatial patterns in each record of data. A plurality of spatial and temporal memory systems are generated according to configuration information. A subset of input data is provided to each spatial and temporal memory system, and two or more of the spatial and temporal memory systems are provided with different fields of input data, and/or different encodings of the fields, and/or different time aggregations of the data. Temporal sequences of spatial patterns are identified at each spatial and temporal memory system based on the provided subset of input data.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 1A is a conceptual diagram of a single Spatial and Temporal Memory System (STMS) processing node in a non-hierarchical system, according to one embodiment.

FIG. 1B is a conceptual diagram illustrating a Hierarchical Spatial and Temporal Memory System (HTMS) including three layers of processing nodes, according to one embodiment.

FIG. 2 is a conceptual diagram illustrating an HTMS with multiple processing nodes at lower levels, according to one embodiment.

DETAILED DESCRIPTION OF EMBODIMENTS

Figure 3:
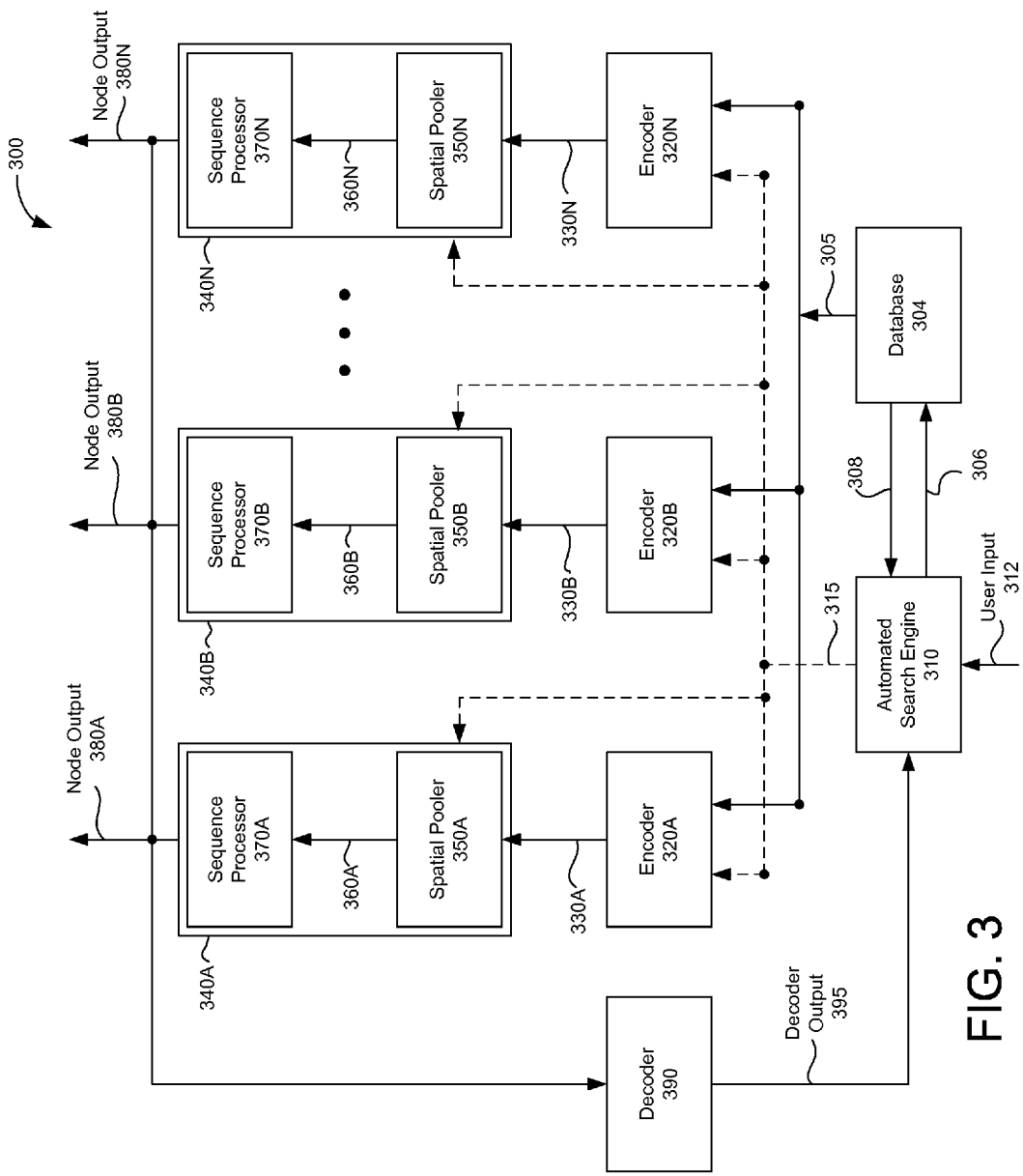
FIG. 3 is a block diagram illustrating an automated search system using STMSs, according to one embodiment.

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, embodiments are not described with reference to any particular programming language. It will be appreciated that a variety of programming languages may be used to implement the teachings as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure set forth herein is intended to be illustrative, but not limiting, of the scope, which is set forth in the claims.

Embodiments relate to encoding various types of data into a distributed representation format for processing by a STMS. Input data to the STMS may be in a format incompatible for processing by STMS. Hence, an encoder receives the input data in a raw form and converts the input data into a distributed representation form. Different coding schemes may be applied to different data sets and data types to increase the performance of the STMS. In one embodiment, the coding schemes are iteratively modified to increase the performance of the STMS for a given data set. Other aspects of the STMS may also be iteratively modified to improve performance.

Embodiments also relate to assessing the performance of the STMS. A STMS may exhibit different performance characteristics based on the configuration or parameters of the STMS or based on the coding scheme used, which includes factors such as the encoding used, the time aggregations applied, and the input data that the STMS encodes and processes. The performance of the STMS may be assessed by determining the accuracy of the prediction of the STMS. Performance data representing the predictive performance of the STMS are generated as a result of the assessment. In one embodiment, the predictive performance of the STMS is assessed by comparing predicted input data with actual input data for one or more time steps. Based on the performance data, a desirable combination of coding schemes, node configurations and node parameters may be selected for processing further input data.

Embodiments also relate to identifying useful relationships between different data fields in a data set using a STMS. The STMS is capable of identifying temporal relationships in data in addition to identifying spatial patterns in the data set. Using the capability of the STMS to identify spatial patterns and temporal sequences, the STMS can more accurately determine relationships in data and make better predictions of future data. Further, different combinations of coding schemes, STMS configurations and STMS parameters may be used to identify useful patterns or sequences in the data.

A STMS as described herein refers to hardware, software, firmware or a combination thereof that is capable of learning and detecting spatial patterns and temporal sequences of spatial patterns in input data. The STMS stores temporal relationships in sequences of spatial patterns and generates useful information based on the stored relationships. The useful information may include, for example, predictions of spatial patterns to be received, predictions of missing parts of spatial patterns received, identifications of spatial patterns or a higher level causes associated with the spatial patterns in input data. The STMS includes at least one processing node and an encoder. The processing node may be embodied, for example, as described in U.S. patent application Ser. No. 13/046,464 entitled "Temporal Memory Using Sparse Distributed Representation, filed on Mar. 11, 2011 (hereinafter referred to as "the '464 application"), which is incorporated by reference herein in its entirety. In one embodiment, a spatial pooler in the STMS receives input data in a distributed representation and processes the input data for learning and/or predicting.

A distributed representation described herein refers to a format for representing data. Data in a distributed representation form has a limited number of elements which may number in hundreds to thousands. In a distributed representation form, different data are represented by different combinations of active and inactive elements. Each element in a distributed representation can in theory be assigned an independent meaning or attribute. Thus, a distributed representation is a set of attributes that represent a data element. A special case of the distributed representation form is the sparse distributed representation form, where the number of active (or inactive) elements is comparatively smaller than the total number of elements.

An coding scheme as described herein refers to a methodology for converting data in a first format to a second format. The first format may be incompatible for processing by a STMS, so conversion to a second format that is compatible for processing by the STMS is required prior to processing by the STMS. The coding scheme may define, among other parameters, the following: (i) the selection of a subset of data fields, (ii) the selection of a subset of data within each data field, (iii) the aggregation of data over certain time intervals, (iv) the conversion of the format from one format to another format (e.g., to a distributed representation format) and (v) the processing or supplementing of data from one source based on data from another data source.

An experiment as described herein refers to a process of configuring a STMS and processing data using the configured STMS. For each experiment, the STMS is configured to use a particular coding scheme to encode input data with the STMS's encoder into a format for processing by the STMS's processing node and operates with certain node parameters.

Performance data as described herein refers to data representing the quantification of the predictive performance of a STMS. Performance data may indicate the percentage of accurate predictions made by the STMS or the deviation of a predicted numeric value of input data compared to an actual numeric value in the input data.

An automated search as described herein refers to the performing of a plurality of experiments to identify predictive models that produce predictions of future data based on a set of given data. The experiments may be performed sequentially or in parallel.

Node parameters as described herein refer to configurable parameters that affect the operation of a STMS. The configuration parameters may include, for example, the number of processing nodes and their connective relationships, the number of cells or columns in the sequence processors of the processing nodes, the rate of learning and forgetting to prune or expand co-occurrences and sequences, and the permissible range of density (or sparsity) of sparse vectors generated by spatial poolers.

Architecture of a Spatial and Temporal Memory System

A STMS stores common spatial patterns in a stream of distributed representations, learns temporal relationships in sequences of the spatial patterns, and generates useful information based on the stored relationships. The useful information may include, for example, predictions of spatial patterns to be received, predictions of part of a spatial pattern that is missing, identifications of spatial patterns or temporal sequences, or grouping patterns and sequences by similarity. A STMS may include a plurality of processing nodes or a single processing node, and may be of a non-hierarchical structure or of a hierarchical structure. A STMS with multiple processing nodes structured in a hierarchical manner is hereinafter referred to as Hierarchical Spatial and Temporal Memory System (HTMS).

FIG. 1A is a conceptual diagram of a non-hierarchical STMS including a single processing node 104, according to one embodiment. The processing node 104 receives input data, determines spatial patterns and temporal sequences in the input data and generates an output. The output of the processing node 104 is based on the spatial and temporal relationships between spatial patterns in the input data. The output may include a prediction of future spatial patterns and/or may indicate how well the prediction matched a subsequent spatial pattern in the input data.

FIG. 1B is a conceptual diagram illustrating an HTMS including three layers of processing nodes, according to one embodiment. In an HTMS, multiple processing nodes learn, predict and infer input at different levels of abstraction. An example HTMS 100 of FIG. 1B comprises three levels where each of level L1, L2 and L3 include one processing node 110, 120 and 130, respectively. HTMS 100 has three levels L1, L2, L3, with level L1 being the lowest level, level L3 being the highest level, and level L2 being an intermediate level between levels L1 and L3. HTMS 100 processes the input data, and outputs a signal that includes a prediction of future spatial patterns in the input and/or indicates how well the prediction matched a subsequent spatial pattern in the input.

The processing nodes of the HTMS may be arranged so that the number of processing nodes decreases as the HTMS level increases. FIG. 2 is a diagram illustrating HTMS 200 having three levels L1, L2, L3, with level L1 being the lowest level, level L3 being the highest level, and level L2 being an intermediate level between levels L1 and L3. HTMS 200 is hierarchically structured so that the processing nodes cover a larger input space as the level ascends. Level L1 has nodes 210A, 210B, 210C and 210D; level L2 has nodes 220A and 220B; and level L3 has node 230. Nodes 210A, 210B, 210C, 210D, 220A, 220B, and 230 are hierarchically connected in a tree-like structure such that each processing node has several children nodes (that is, nodes connected at a lower level) and one parent node (that is, node connected at a higher level).

Further, HTMS 200 propagates bottom-up signals up the hierarchy as well as propagates top-down signals down the hierarchy. That is, each processing node 210A, 210B, 210C, 210D, 220A, 220B, and 230 may be arranged to (i) propagate information up the HTMS hierarchy to a connected parent node, and (ii) propagate information down the HTMS hierarchy to any connected children nodes. In one embodiment, information propagated down the HTMS hierarchy includes performance data describing the success of a particular experiment. In another embodiment, information propagated down the HTMS hierarchy includes predictions of what sequences the child node is likely to receive next.

The number of levels or the arrangement of processing nodes in FIGS. 1A, 1B and 2 are merely illustrative. Many variants of a STMS system may be developed and deployed depending on the specific application.

A STMS includes one or more processing nodes and an associated encoder. Some of many functions performed by a processing node include, for example, spatial pooling and temporal processing. The spatial pooling described herein refers to the process of mapping distributed input patterns onto a set of coincidence detectors each of which learns common spatial co-occurrences in the input patterns. The temporal processing may include, but is not limited to, learning temporal sequences, performing inference, recognizing temporal sequences, predicting temporal sequences, labeling temporal sequences and temporal pooling. The learning of temporal sequences described herein refers to one or more of initializing, expanding, contracting, merging and splitting temporal sequences. The prediction described herein refers to assessing the likelihood that certain spatial patterns will appear subsequently in the input data. The temporal pooling described herein refers to processing input data to provide an output that is more stable and invariable over time compared to spatial patterns in the input data. Hardware, software, firmware or a combination thereof for performing the spatial pooling is hereinafter referred to as a spatial pooler. Hardware, software, firmware or a combination thereof for performing the temporal processing is hereinafter referred to as a sequence processor. The sequence processor may perform one or more of learning temporal sequences, performing inference, recognizing temporal sequences, predicting temporal sequences, labeling temporal sequences and temporal pooling.

In one embodiment, one or more STMSs receive input data representing images, videos, audio signals, sensor signals, data related to network traffic, financial transaction data, communication signals (e.g., emails, text messages and instant messages), documents, insurance records, biometric information, parameters for manufacturing process (e.g., semiconductor fabrication parameters), inventory patterns, energy or power usage patterns, data representing genes, results of scientific experiments or parameters associated with operation of a machine (e.g., vehicle operation) and medical treatment data. The STMS may process such inputs and produce an output representing, among others, identification of objects shown in an image, identification of recognized gestures, classification of digital images as pornographic or non-pornographic, identification of email messages as unsolicited bulk email ('spam') or legitimate email ('non-spam'), prediction of a trend in financial market, prediction of failures in a large-scale power system, identification of a speaker in an audio recording, classification of loan applicants as good or bad credit risks, identification of network traffic as malicious or benign, identity of a person appearing in the image, processed natural language processing, weather forecast results, patterns of a person's behavior, control signals for machines (e.g., automatic vehicle navigation), gene expression and protein interactions, analytic information on access to resources on a network, parameters for optimizing a manufacturing process, predicted inventory, predicted energy usage in a building or facility, web analytics (e.g., predicting which link or advertisement that users are likely to click), identification of anomalous patterns in insurance records, prediction on results of experiments, indication of illness that a person is likely to experience, selection of contents that may be of interest to a user, indication on prediction of a person's behavior (e.g., ticket purchase, no-show behavior), prediction on election, prediction/detection of adverse events, a string of texts in the image, indication representing topic in text, prediction of sales, prediction of needed resources such as number of employees needed on any day or the amount of raw materials needed in a future time period, and a summary of text or prediction on reaction to medical treatments. The underlying representation (e.g., photo, audio, sales data, and etc.) can be stored in a non-transitory storage medium.

For the sake of simplicity, the following embodiments are described primarily with reference to a non-hierarchical STMS. However, similar or same principle and operations as described herein are equally applicable to an HTMS.

Overall Structure and Operation of an Automated Search System

FIG. 3 is a block diagram illustrating an automated search system 300, according to one embodiment. The automated search system 300 may include, among other components, a database or other source of data records 304, an automated search engine 310, encoders 320A through 320N (hereinafter collectively referred to as the "encoders 320"), processing nodes 340A through 340N (hereinafter collectively referred to as the "processing nodes 340"), and decoder 390. One or more of these components in automated search system 300 may be combined into a single module or be divided into multiple modules. Further, each component may be embodied in a single hardware device or may be distributed across multiple hardware devices.

The automated search engine 310 includes hardware, software, firmware or a combination thereof that manages the overall process of an automated search. The automated search engine 310 may perform, among others, the following functions: (i) receiving and processing a user input 312, (ii) determining an order of experiments, (iii) selecting coding schemes for encoders 320, and (iv) configuring the processing nodes 340. The automated search engine 310 may iteratively perform multiple experiments on data from database 304 in parallel, in series or a combination thereof until predetermined criteria are met. An example of the automated search engine 310 is described below in detail with reference to FIG. 5.

The decoder 390 includes hardware, software, firmware or a combination thereof that decodes the node outputs 380A through 380N (hereinafter collectively referred to as "node outputs 380"). The decoder 390 stores parameters of the processing nodes and processes the node outputs 380 to produce the decoder output 395, which may be used to determine the accuracy of predictions made by the processing nodes 340, as described below in detail with reference to FIG. 13.

Each of the processing nodes 340 in combination with an encoder 320 constitutes a distinct STMS for performing predictions. An example of the processing node 340 is described below in detail with reference to FIG. 11. Although only non-hierarchical STMSs, each with a single node, are illustrated in FIG. 3, hierarchically structured STMS with multiple processing nodes may also be used in the automated search system 300.

Encoder 320 includes hardware, firmware, software or a combination thereof for encoding data 305 (retrieved from, for example, database 304) into a format (e.g., distributed representation form) according to a coding scheme. Each encoder 320 is included in a STMS to encode data for processing by an associated processing node 340. In one embodiment, each encoder 320 is instantiated and configured by the automated search engine 310 to implement the experiments managed by the automated search engine 310. An example embodiment of an encoder 320 is described below in detail with reference to FIG. 6A. Although FIG. 3 displays only one encoder 320 for each processing node 340, the automated search system 300 may assign one encoder 320 to multiple processing nodes 340.

The database 304 provides data for analysis and/or processing by the automated search system 300. Database 304 feeds data 305 to the encoders 320 for conversion into a format compatible for processing with the processing nodes 340. Database 304 may be embodied on a computing device using conventional technology or technology to be developed in the future. In addition to or alternatively to receiving data 305 from database 304, the automated search system 300 may receive data from other sources such as point of sale (POS) devices, sensor devices, live or real-time data streams, or external databases (hereinafter referred to as an "external data source").

The Encoders 320 utilize one or more coding schemes to encode data 305 into encoded input data 330 in a distributed representation form compatible for processing by processing nodes 340. An encoder 320 retrieves entries from one or more select data fields of the database 304 according to a coding scheme. Each encoder 320 may retrieve data from distinct sets of data fields. For example, encoder 320A may retrieve entries from a first data field, encoder 320B may retrieve entries from second and third data fields, encoder 320C may retrieve entries from fourth and sixth data fields, and so forth. In one embodiment, the encoders 320 select the data fields retrieved by each encoder 320. In an alternative embodiment, automated search engine 310 selects the data fields each encoder 320 retrieves.

In one embodiment, the encoders 320 select a coding scheme to use in encoding data 305, or use a default coding scheme for encoding data 305. Alternatively, the encoders 320 may receive a coding scheme from the automated search engine 310. For example, the automated search engine 310 configures or instantiates one or more encoders 320 to encode data 305 using one or more coding schemes. In one embodiment, the automated search engine 310 selects a default coding scheme for use in configuring the encoders 320, or selects a coding scheme according to a maintained experiment order. Alternatively, as discussed below in detail with reference to FIG. 4, the automated search engine 310 may select a coding scheme based on the performance of previously selected coding schemes. In addition, coding schemes may be selected based on analysis of the contents of database 304 or based on analysis of selected data fields. For example, the automated search engine 310 analyzes the data stored in two data fields in database 304 to select coding schemes for encoding the data of the two data fields.

Each of the processing nodes 340 may include, among other components, a spatial pooler (one of spatial poolers 350A through 350N, hereinafter "spatial pooler 350") which outputs a sparse vector 360 (one of sparse vectors 360A through 360N) to a sequence processor (one of sequence processors 370A through 370N, hereinafter "sequence processor 370"). A processing node 340 receives encoded input data 330 (one of encoded input data 330A through 330N, hereinafter "encoded input data 330") from an encoder 320, and the processing node's spatial pooler 350 performs spatial pooling on the encoded data 330 to produce a sparse vector 360. The sequence processor 370 of the processing node 340 receives the sparse vector 360, performs sequence processing and produces a node output 380. The node output 380 includes, among others, a prediction of data to be subsequently received at the processing node 340 or alternately a prediction of part of the data missing in the current input. The detailed operation of the processing nodes 340 is described below in detail with reference to FIGS. 12 and 13.

Example Operation of an Automated Search System

Each STMS in the automated search system 300 analyzes, learns and makes predictions based on different perspectives of input data depending on the configuration of the encoders 320 and the processing nodes 340. A STMS may identify and learn different relationships in data 305 than a different STMS (e.g., a combination of processing node 340B and encoder 340B) due to different coding schemes and configurations (e.g., various node parameters). By analyzing, leaning and making predictions on different perspectives of input data, multiple STMSs may identify different patterns and sequences in the input data, and produce useful predictions that would otherwise not be available by using a single STMS. The automated search system 300 automatically experiments with different coding schemes and configurations to determine one or more predictive models describing the input data.

Figure 4:
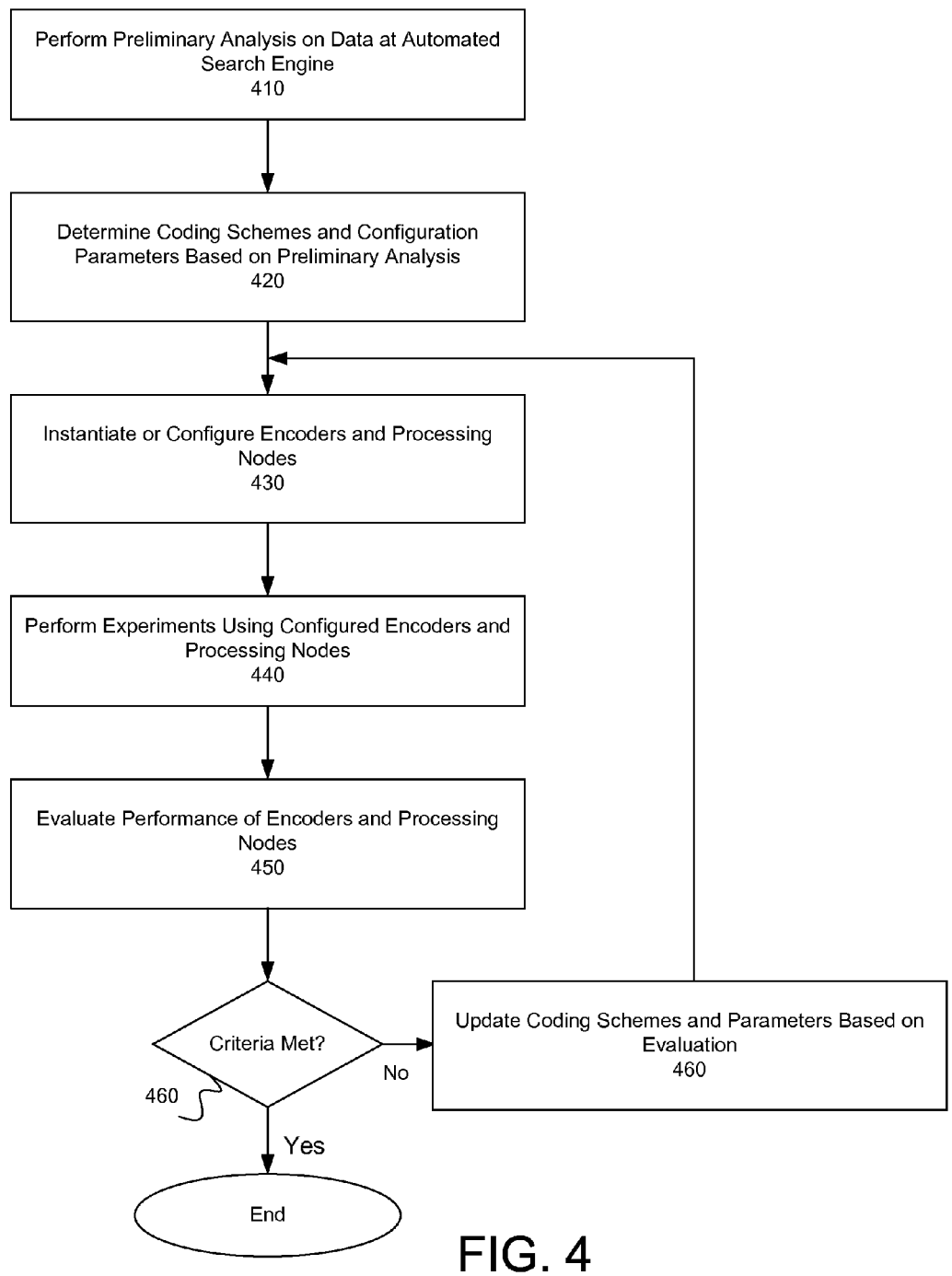
FIG. 4 is a flowchart illustrating an overall automated search process, according to one embodiment.

FIG. 4 is a flowchart illustrating an overall automated search process, according to one embodiment. The automated search engine 310 issues a request 306 and retrieves a subset of entries 306 in the database 304 and/or the external data source 510 for preliminary analysis. The automated search engine 310 performs 410 preliminary analysis of the subset of entries 410, which may take into account, for instance, the data field type, the data category, the data content, and the data trends or behavior. Based on the preliminary analysis, the automated search engine 310 determines 420 coding schemes and node parameters of the STMSs. The automated search engine 320 can take other factors (e.g., user input) in determining the coding schemes and the node parameters for use by the STMSs.

In one embodiment, multiple sets of coding schemes and parameters are determined to instantiate or configure multiple sets of encoders and STMSs for operation in parallel, as illustrated in FIG. 3. In another embodiment, a single coding scheme is determined to instantiate or configure a single STMS at a time. In this embodiment, multiple sets of encoders and STMSs are instantiated or configured in series.

The determined coding scheme may indicate, among others, which data fields are to be included in each of encoded input data 330A through 330N. For example, a first coding scheme may cause an encoder to include converted versions of first and second data fields in the encoded input data while a second coding scheme may cause another encoder to include converted versions of first and third data fields in the encoded input data. A STMS using the first coding scheme may identify spatial and temporal relationships between data entries in first and second data fields whereas a STMS using the second coding scheme may identify spatial and temporal relationships between data entries in first and third data fields.

The automated search engine 310 instantiates or configures 430 encoders 320 and corresponding processing nodes 340 according to the determined coding schemes and configuration parameters. The automated search system 300 performs 440 experiments using encoders and processing nodes instantiated or configured by the automated search engine 310. Each experiment includes the process of selectively converting one or more data fields into encoded data input 330, and then feeding the encoded data input 330 to the STMS's processing nodes. In response to receiving the encoded data input 330, each STMS generates a node output 380. More than one set of encoders and processing nodes can be operated simultaneously to expedite the automatic search process.

Each of the node outputs 380A through 380M includes information representing predicted input data. Node outputs 380 are provided to the decoder 390 to obtain decoder outputs 395. The decoder outputs 395 are fed to the automated search engine 310 to evaluate 450 the predictive performance of STMSs.

If it is determined 460 that the experiments satisfy predetermined criteria (e.g., reaching a limit of allocated computer time, or accuracy above a particular threshold), a desired predictive model (in the form of the coding scheme used by the encoder and the associated processing node configuration and parameters) is obtained and the process ends. Conversely, if the experiments do not satisfy the predetermined criteria, the coding schemes and parameters are updated 460 based on the evaluation. The process proceeds to instantiating or configuring 430 STMSs and repeats the subsequent steps.

The processors and their sequences described in FIG. 4 are merely illustrative. Additional steps may be added or omitted from the processes described in FIG. 4. For example, a predetermined number of encoders and STMSs may be instantiated or configured 430 in parallel, and updating 460 may not be iteratively performed even when the predetermined criteria are not met.

In one embodiment, the automated search engine 310 maintains a priority or selection of experiments, each experiment associated with a different coding scheme and/or node parameters. The automated search engine 310 modifies priority or selection of experiments based on the predictive performance of STMSs in experiments that were previously performed. Optimization algorithms or other heuristic algorithms may be used to achieve coding schemes, node parameters or a combination thereof exhibiting higher predictive performance in an efficient manner.

In one embodiment, processing by a STMS is terminated if the performance of the STMS remains low or receives one or more error signals indicating certain types of errors are generated in the STMS. The automated search engine may attempt to debug the errors or launch a new STMS to perform another experiment. In this way, less computing or storage resources are wasted on the STMS that is unlikely to be productive.

Example Architecture of an Automated Search Engine

Figure 5:
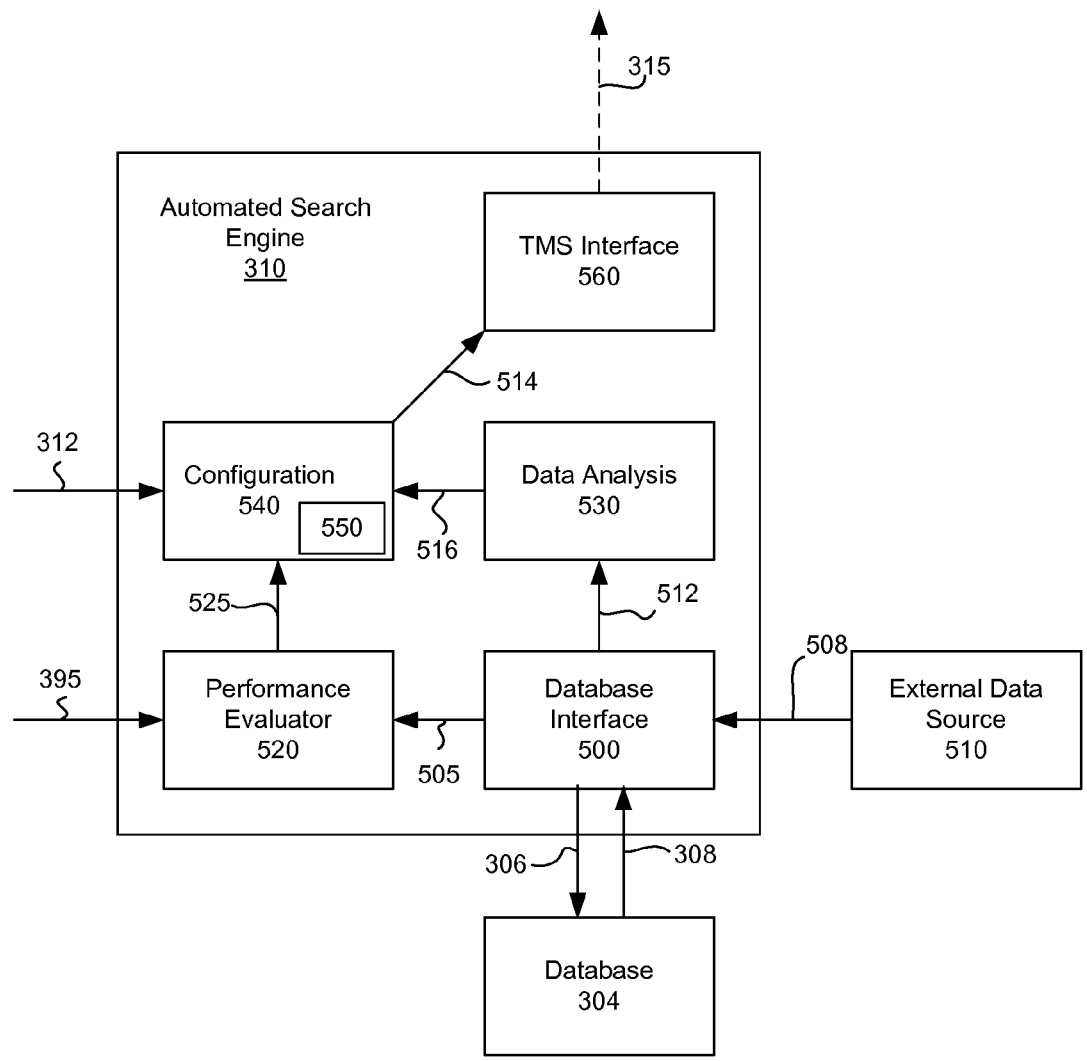
FIG. 5 is a block diagram illustrating an automated search engine of the automated search system, according to one embodiment.

FIG. 5 is a block diagram illustrating an automated search engine 310, according to one embodiment. The automated search engine 310 manages an overall process of instantiating and configuring STMSs (i.e., sets of encoders 320 and processing nodes 340), performs experiments using the STMSs, evaluates the performance of the STMSs, and identifies one or more STMSs yielding useful predictions. Automated search engine 310 may include, among other components, database interface 500, performance evaluator 520, data analysis module 530, configuration module 540, and STMS interface 560.

The database interface 500 includes hardware, software, firmware or a combination thereof for retrieving data from a database 304 for preliminary analysis and for use in evaluating predictions made by STMSs. Database interface 500 may also request and receive data 508 from an external data source 510 to supplement or as an alternate to data in the database 304. The external data source 510 may include point of sale (POS) devices, web resources, sensor signals and data provided by users or data vendors. In one embodiment, the database interface 500 stores information on how to correlate certain data fields in the database 304 with data available from the external data source 510. For example, the database interface 500 stores information identifying that a data field on 'date' in the database 304 can be replaced with 'weather information' corresponding to date field data available from an external data source. The database interface 500 provides sampled data 512 to the data analysis module 530 for preliminary analysis, and also provides raw input data 505 to the performance evaluator 520 for evaluating the predictive performance of a STMS. The raw input data 505 represents fields of data from the database 304 or the external data source 510 that appears in a subsequent entry or time relative to data 305 causing a STMS to generate a decoder output 395 that is being compared with raw input data 505.

The data analysis module 530 includes hardware, software, firmware or a combination thereof for performing preliminary analysis of sampled data 512 received from the database 304 and the external data source 510 via the database interface 500. The sampled data 512 includes a subset of entries from the database 504 and subset of data available from the external database 510. Based on, for example, data field types, the numerical range of values in the data, data trends or behavior, the data analysis module 530 generates and sends initial configuration information 516 to the configuration module 540.

The performance evaluator 520 includes hardware, software, firmware or a combination thereof for evaluating the decoder output 395 to produce performance data 525 that indicates the capability or performance of a processing node 340 in making predictions, as described below in detail with reference to FIG. 16.

The configuration module 540 includes hardware, software, firmware or a combination thereof for generating experiment parameters 514 based on one or more of user input 312, performance data 525, initial configuration information 516 and previously used experiment parameters. In one embodiment, the configuration module 540 uses an optimization algorithm to compute experiment parameters 514 for a next round of experiments or modifies experiment parameters 514 in a predetermined order of experiments. The configuration module 540 includes the coding scheme manager 550 for selecting coding schemes for a round of experiments. After the configuration module 540 determines one or more data fields to be retrieved at a STMS, the coding scheme manager 550 determines a data encoding for use by an encoder 320 and any parameters for applying the data encoding, as described below in detail in the section entitled "Coding Scheme Selection." The coding schemes selected by the coding scheme manager 550 are included in experiment parameters 514.

Experiment parameters 514 define how the encoders 320 and the processing nodes 340 should be instantiated or configured in a current round of experiments. The experiment parameters 514 may define, for example, coding schemes and node parameters for each STMS. A coding scheme defines the manner in which an encoder converts the input data into encoded input data for processing by an associated processing node. The coding scheme defines, (i) the selecting of a subset of data fields, (ii) the selecting of a subset of data within each data field, (iii) the aggregating of data over a time frame, (iv) the conversion of the format from one format to another format (e.g., from a number, enumerated value, or date to a distributed representation format) and (v) the processing or supplementing of data from one source based on data from another data source (e.g., an external data source). The node parameters define, for example, the number of processing nodes and their connective relationships, the number of cells or columns in the sequence processors of the processing nodes, the activation of algorithms to prune or expand co-occurrences, and the permissible range of density (or sparsity) of sparse vectors generated by spatial poolers.

In one embodiment, user input 312 includes information to facilitate the automated search system 300 to learn and identify patterns and sequences in the input data. If a user knows that a particular set of data fields are likely to be correlated or a certain time aggregation is likely to result in meaningful predictions, the user may input user input 312 to the configuration module 540 to start initial experiments using the user defined parameters and configurations. The user input 312 may also identify an external data source 510 for processing or for supplementing the database 304.

The STMS interface 560 includes hardware, software, firmware or a combination thereof for distributing configuration information 315 to one or more STMSs for a round of experiments. The STMS interface 560 receives the experiment parameters 514, formats the experiment parameters into configuration information (a combination of a coding scheme and node parameters) for each STMS, and transmits the configuration information to each STMS. In one embodiment, multiple STMSs or STMS components are instantiated on computing devices dispersed in different locations. In such an embodiment, the STMS interface 560 converts the configuration information 315 for transmission over a network to the desired computing devices.

Example Architecture and Operation of an Encoder

Figure 6A:
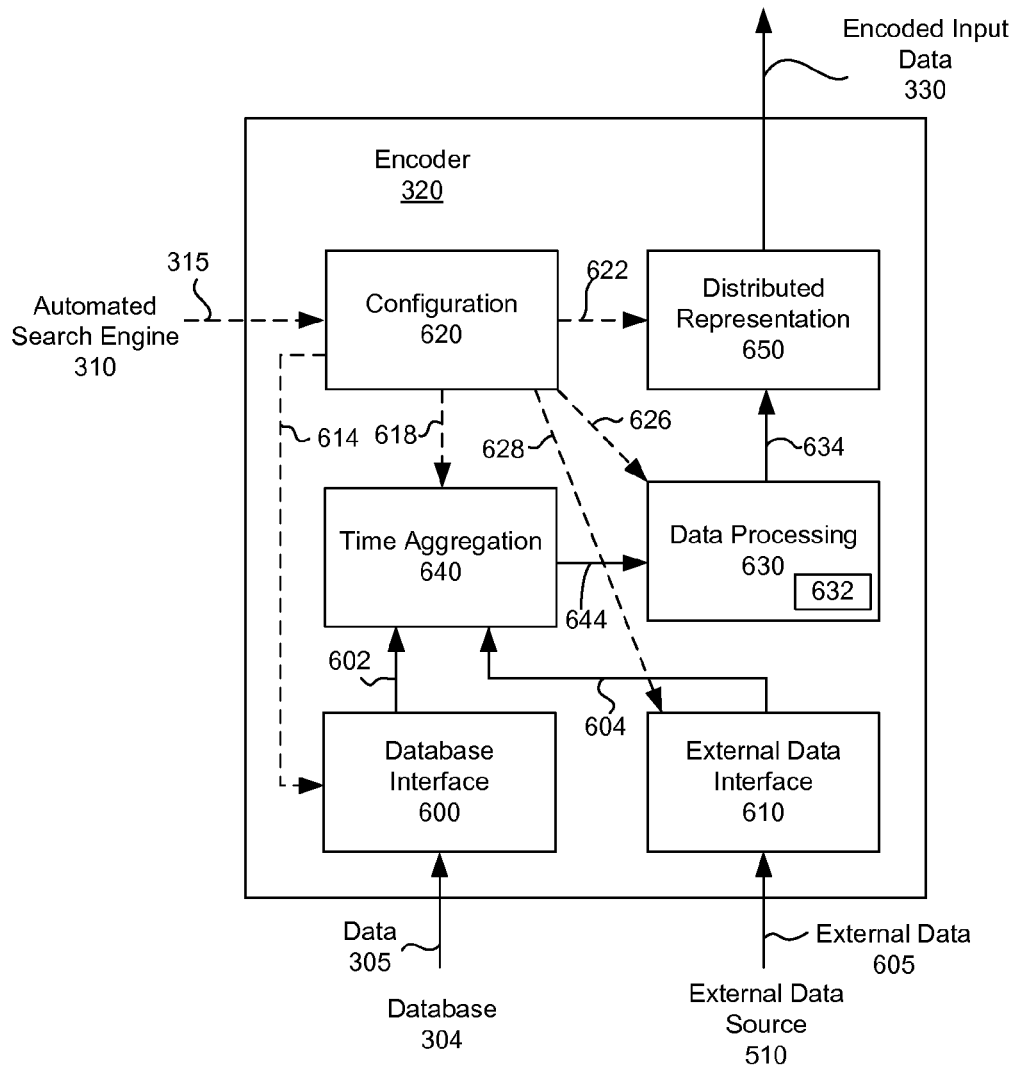
FIG. 6A is a block diagram illustrating a STMS encoder, according to one embodiment.

FIG. 6A is a block diagram illustrating an encoder 320 in a STMS, according to one embodiment. The encoder 320 retrieves data from sources, processes the data (as needed) and converts the data into a distributed representation form for feeding into one or more processing nodes 340. The configuration of the encoder 320 may be reconfigured or updated after a round of experiments is terminated. Alternatively, the configuration of the encoder 320 may be continuously updated during experiments.

Encoder 320 may include, among other components, a database interface 600, an external data interface 610, a configuration module 620, a data processing module 630, a time aggregation module 640, and a distributed representation module 650. In some embodiments, the encoder 320 may contain fewer or additional modules, and certain functionalities of the encoder 320 may be performed external to the encoder 320. For example, the functionality of the data processing module 630 or the time aggregation module 640 is performed by the automated search engine 310. In some embodiments, the functionalities of the components of the encoder 620 may be combined into a single component. For example, the functionalities of the configuration module 620, the data processing module 630, the time aggregation module 640 and the distributed representation module 650 are combined into a single processing module.

The configuration module 620 receives configuration information 315 from the automated search engine 310 and configures other components of the encoder 320 by sending out configuration signals 614, 618, 622, 626 and 628 to implement a coding scheme as identified in the configuration information 315. Specifically, the configuration module 620 sends a database interface configuration signal 614 instructing the database interface 600 to retrieve certain field(s) of data from the database 304. For this purpose, the database interface 600 sends queries to the database 304 and receives data 305 as a result. Depending on the data 305 received from the database 304, the database interface 600 may further extract relevant fields or entries 602 from the data 305 and send them to the time aggregation module 640.

A similar process is applicable to the external data interface 610. That is, the configuration module 620 sends an external configuration signal 644 to configure the external data interface 610 to receive external data 605 from the external data source 510. The external data interface 610 may further extract relevant fields or entries 604 from the external data 605 and send them to time aggregation module 640.

The time aggregation module 640 performs time aggregations on the received data 602, 604, and sends the aggregated data 644 to the data processing module 630. The time aggregation module 640 receives a time configuration signal 618 from the configuration module 620 to perform time aggregation, as described below in detail with reference to FIGS. 9 and 10. Although the time aggregation module 640 is indicated as being placed between the data source interfaces (i.e., the database interface 600 and the external data interface 610) and the data processing module 630, the time aggregation module 640 may be placed between the data processing module 630 and the distributed representation module 650 to perform time aggregation on processed data. If no time aggregation is performed, the extracted fields or entries 602 and 604 may bypass the time aggregation module 640 and feed directly to the data processing module 630.

The data processing module 630 performs data processing operations on the aggregated data 644 to generate processed data 630, according to a preprocessing signal 626 received from the configuration module 620. The preprocessing signal 626 defines how the data processing module 630 should preprocess data before sending the data to the distributed representation module 650. The data processing module 630 stores functions 632 to preprocess aggregated data 644 or extracted fields or entries 602 and 604 before conversion to a distributed representation format. One or more functions 632 may be embodied as look-up tables or arithmetic processing units. Representative functions of the data processing module 630 include scalar multiplications and various filtering functions. The data processing module 630 may be bypassed if no further processing is to be performed on the aggregated data 644. The data processing module 630 may also replace or supplant data in certain extracted data fields or entries 602 from the database 304 with data in extracted fields or entries 604 from the external data source 510.

The distributed representation module 650 encodes processed data 634 (or aggregated data 644, or extracted fields or entries 602 and 604) to a distributed representation format. For each data field, the distributed representation module 650 converts data entries into a distributed representation format. The distributed representation module 650 then concatenates the converted data entries for different data fields, forming encoded input data 330. In one embodiment, the distributed representation module 650 stores multiple mapping tables, with each table mapping possible values of each data field to certain distributed representation formats. Details of coding schemes are described in the subsequent section entitled "Coding Scheme Selection."

Concatenating encoded fields together has the benefit of, among other benefits, allowing a processing node to detect spatial patterns and temporal sequences across more than one data field. Table 1 illustrates an example where a first data field (Field 1) and a second data field (Field 2) each contains 4 data entries in a distributed representation format. The Concatenated Input Data column of Table 1 shows the resulting concatenation of Field 1 and Field 2. Underlined portions of the Concatenated Input Data column entries in Table 1 represent data associated with the entries of Field 2. It should be noted that typical distributed patterns will contain many more bits than in Table 1.

TABLE 1

Data field concatenation example.

| | Field 1 | Field 2 | Concatenated Input Data |
|---|---|---|---|
| data [0] | 0010110 | 100 | 0010110100 |
| data [1] | 0110010 | 111 | 0110010111 |
| data [2] | 1001011 | 101 | 1001011101 |
| data [3] | 0100110 | 000 | 0100110000 |

Figure 6B:
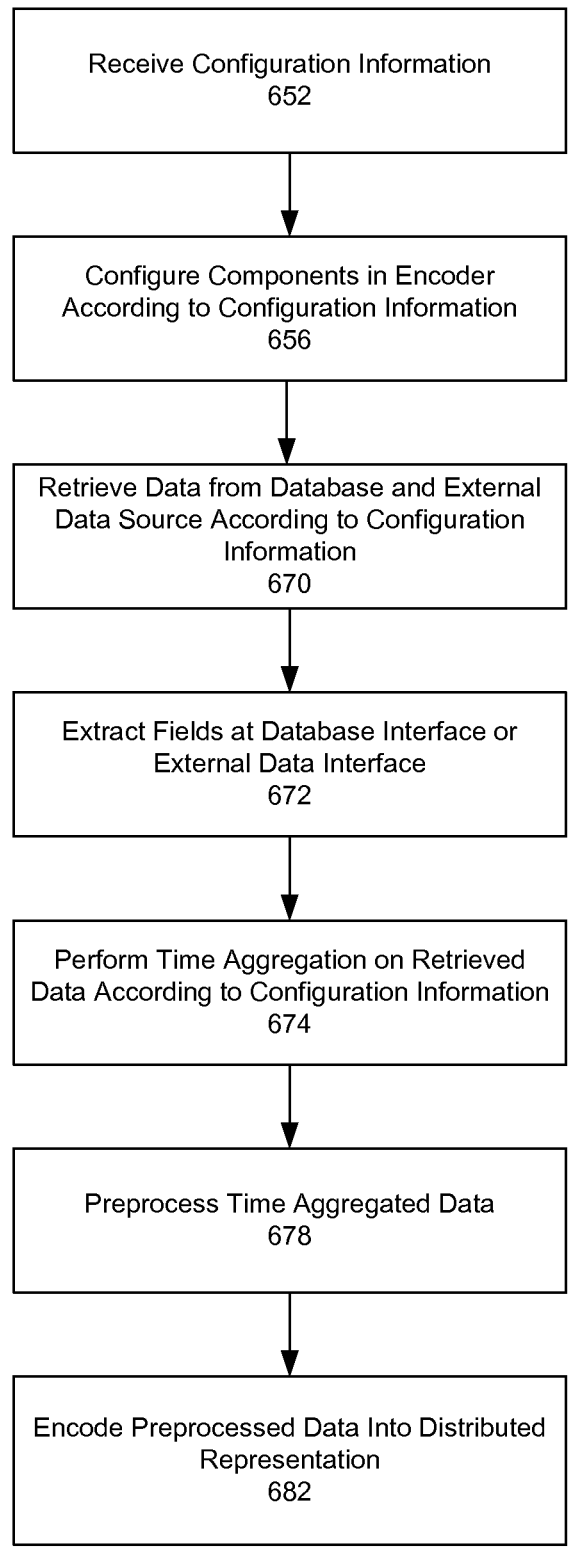
FIG. 6B is a flowchart illustrating the process of encoding data retrieved from database based on configuration information, according to one embodiment.

FIG. 6B is a flowchart illustrating the process of encoding data retrieved from the database 304 and/or the external data source 510, based on configuration information 315, according to one embodiment. The encoder 320 receives 652 configuration information 315 from the automated search engine 310. The encoder 320 then configures 656 components (e.g., the data interface 600, the external data interface 610, the time aggregation module 640, the data processing module 630 and the distributed representation module 650) according to the configuration information 315. The configuration information 315 may indicate the inactivation of one or more of the components in the encoder 320. For example, the time aggregation module 640 or the data processing module 630 is deactivated. In case any of the components are inactive, data may bypass these inactive modules and feed directly to the module subsequent to the inactive modules.

After the database interface 600 and the external data interface 610 are configured according to configuration information 315, the database interface 600 interacts with the database 304 or the external data source 510 to retrieve 670 data 305. The external data interface 610 may also interact with the external data source 510 to retrieve 670 external data 605 from the external data source 510, as determined by configuration information 315.

The database interface 600 or the external data interface 610 may further extract 672 the selected fields 602 and 604 from data 305 and external data 605. If applicable, time aggregation is performed 674 on the extracted fields 602 and 604. In addition, preprocessing is performed 678 on the extracted fields 602 and 604 or the aggregated data 644, if applicable.

After performing extraction, time aggregation and/or data preprocessing, the resulting data is encoded 682 into a distributed representation form. Encoding 682 may include concatenating multiple encoded data fields into a single binary vector.

The processes illustrated in FIG. 6B are merely illustrative. One or more of (i) extracting 672 fields or entries, (ii) performing 674 time aggregation and (iii) preprocessing 678 of data may be omitted. Further, steps may be performed in alternative orders or in parallel. Moreover, different fields of data may undergo different processing. For example, one field may be retrieved from the database 304 and then directly encoded into a distributed representation form while another field may undergo time aggregation or preprocessing before being encoded into a distributed representation form.

Coding Scheme Selection

Data for analysis may include data fields of various formats. Example data formats include integers, floating-point values, Boolean values and alphanumeric strings. However, a processing node in a STMS may be compatible with only a certain type of data format (e.g., a distributed representation). Hence, in order to process data in a format that is not compatible for processing by a processing node, the data is converted to a compatible data format using a coding scheme, as described herein.

Generally, coding schemes may be classified into the following three separate categories: (i) category coding schemes for converting data of enumerated types (e.g., alphanumeric strings, integers with limited values, or Boolean values) into a distributed representation, (ii) scalar coding schemes for converting scalar data (e.g., integers and floating-point values) to a distributed representation, and (iii) hybrid coding schemes. The hybrid coding schemes use a combination of category coding schemes and scalar coding schemes to encode a data field. Data used in hybrid coding schemes may be available from a single data source (e.g., a database 304) or available from multiple sources (e.g., a database 304 and an external data source 510).

An example of category coding scheme for encoding time entries into a distributed representation is described herein with reference to Table 1. In this example, suits of cards in a series of cards withdrawn from a card deck are converted to a distributed representation of 5 bits:

TABLE 1

Encoding example by card type.

| | |
|---|---|
| bit [0] | Club |
| bit [1] | Diamond |
| bit [2] | Heart |
| bit [3] | Spade |
| bit [4] | Other cards |

Using the coding scheme of Table 1, a card of a club suit is converted to a distributed representation of "10000," a card of a diamond suit is converted to "01000," a card of a heart suit is converted to "00100," a card of a spade suit is converted to "00010," and a card not belonging to any of these suits (e.g., joker card) is converted to "00001."

Table 1 shows a simple encoding scheme using very few bits and where each encoded value is represented by a single bit and there is no overlap between the different encodings. Generally a distributed encoding would use tens or hundreds of bits of which some small percentage are set to "1". In such an encoding scheme the number of different values can be much greater than the number of bits used to represent them. In such a scheme any two randomly chosen encodings would likely share just a few bits in common. Further, it is possible to assign meanings to the individual bits such that encodings with similar meanings would have an overlap that is greater than chance. In this way the STMS can recognize patterns based on the meanings of the encodings.

An example of a scalar coding scheme is described herein with reference to Table 2. In this example, the price of an item is converted to a distributed representation of 6 bits using a non-overlapping price range. For example, a data entry indicating a price of $25 is encoded to "000100" and data entry indicating a price of $45 is encoded into "010000."

TABLE 2

| Encoding example for prices. | |
| --- | --- |
| bit [0] | $0.00–$10.00 |
| bit [1] | $10.00–$20.00 |
| bit [2] | $20.00–$30.00 |
| bit [3] | $30.00–$40.00 |
| bit [4] | $40.00–$50.00 |
| bit [5] | $50.00–$110.00 |

An alternative scalar coding scheme using overlapping ranges is described herein with reference to Table 3. In this example, encoded data in a distributed representation include bits representing overlapping ranges. For example, a coding scheme produces a distributed representation of 6 bits where each bit represents the following price ranges:

TABLE 3

| Encoding example for prices. | |
| --- | --- |
| bit [0] | $0.00–$30.00 |
| bit [1] | $10.00–$40.00 |
| bit [2] | $20.00–$60.00 |
| bit [3] | $40.00–$75.00 |
| bit [4] | $55.00–$100.00 |
| bit [5] | $70.00–$110.00 |

Using this example encoding, the price $35 is encoded as the distributed representation "000110", and the price $59 is encoded as the distributed representation "011100". By overlapping numeric ranges corresponding to active bits, encoded data entries with similar numerical values have more bits in common than encoded data entries with dissimilar numeral values. Among other advantages, using data encoded with overlapping numeric ranges facilitates the processing node 340 in learning and classifying spatial co-occurrences in the input data. The same concept of overlapping ranges can be applied to distribute representations using tens or hundreds of bits.

Figure 7:
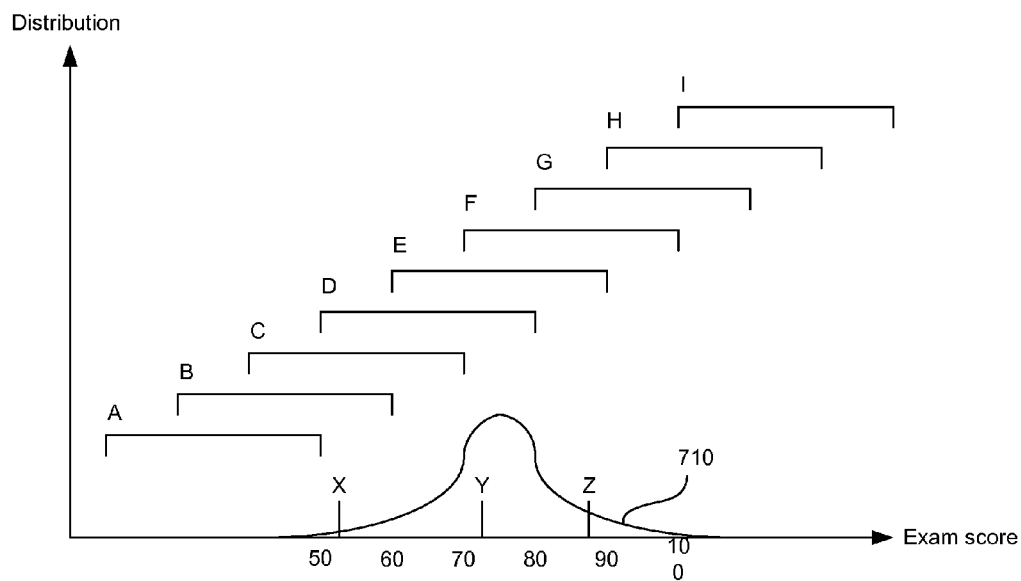
FIG. 7 is a graph illustrating an example scheme for encoding entries in a database, according to one embodiment.

FIG. 7 is a graph illustrating an example of a scalar coding scheme using overlapping ranges (i.e., buckets), according to one embodiment. Bits of a distributed representation with overlapping ranges may be visualized using overlapping buckets. The embodiment of FIG. 7 displays an example distribution curve 710 of exam scores where buckets A through I are distributed evenly along the exam score axis. This scalar coding scheme produces a distributed representation bit for each of the 9 buckets, where the distributed representation bit is a "1" if a particular exam score falls within a particular bucket. For example, exam score X is encoded as the distributed representation "011100000", exam score Y is encoded as the distributed representation "000111000", and exam score Z is encoded as the distributed representation "000011100".

Figure 8:
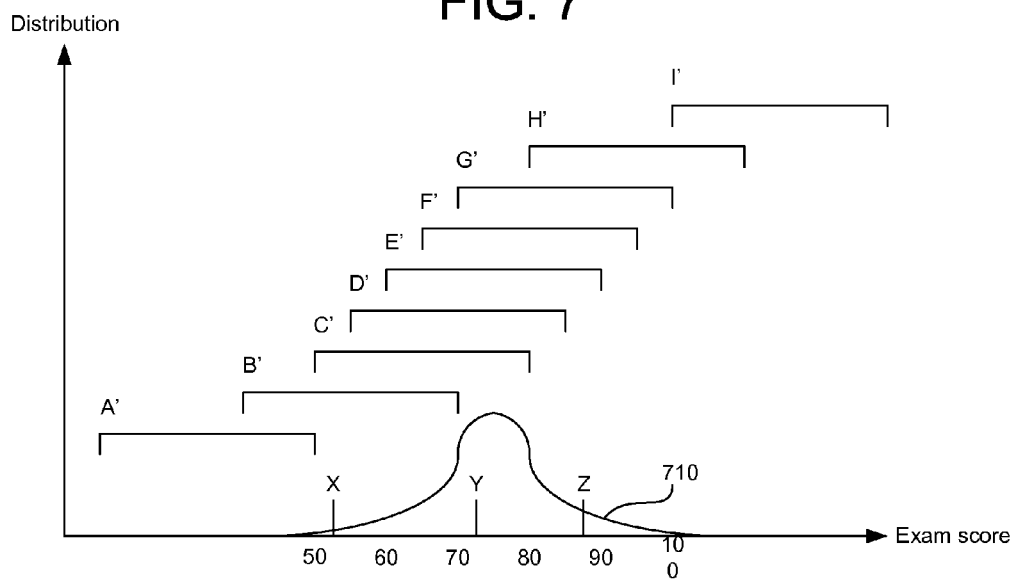
FIG. 8 is a graph illustrating another example scheme for encoding entries in a database, according to one embodiment.

To provide better resolution for data in a particular range, buckets may be distributed unevenly, concentrating the distribution of the buckets around particular values. FIG. 8 is a graph illustrating another example scalar coding scheme for the same distribution curve 710 but with buckets A' through I' placed differently compared to the example of FIG. 7. Since the exam scores are distributed along a bell curve centered at the exam score "75," a scalar coding scheme clustering buckets around a median exam score (e.g., around 75) provides better resolution of data compared the scalar coding scheme of FIG. 7. In the coding scheme of FIG. 8, exam score X is encoded as the distributed representation "011000000", exam score Y is encoded as the distributed representation "001111100", and exam score Z is encoded as the distributed representation "000011110". In one embodiment, a preliminary analysis performed by the data analysis module 530 of the automated search engine 310 includes identifying such a concentration of data values. Based on the identification, scalar coding schemes for the encoders 320 may be configured for more efficient operations.

An example of a hybrid coding scheme is described herein with reference to table 4. In this example, encoded data in a distributed representation form includes bits indicating disparate information about the same date where bits in encoded data represent the following:

TABLE 4

| Encoding example for dates. | |
| --- | --- |
| bits [6-0] | Day of the week: Mon = 0000001, Tues = 0000010, etc. |
| bit [18-7] | Month of the year: Jan = 000000000001, Feb = 000000000010, etc. |
| bit [19] | Holiday?: yes = 1, no = 0 |
| bit [20] | First half of month?: yes = 1, no = 0 |
| bits [23-21] | Weather?: rain = 001, cloudy, no rain = 010, sunny = 100 |

Using this example encoding, the date Dec. 28, 1981 is encoded as the distributed representation (assuming it was raining) "001001000000000000000001". The encoding scheme for Table 4 involves both category coding schemes and scalar coding schemes. That is, bits [6-0], [19], [20] and [23-21] are encoded using category encoding schemes whereas bit [18-7] are encoded using a scalar encoding scheme.

Another example of a hybrid coding scheme involves encoding data for a data field representing countries. Countries are an enumerated data type. However, scalar data associated the countries may be encoded using a category coding scheme or a scalar coding scheme. For example, the coding scheme may generate encoded data to include bits related to location of a country (e.g., "001" if the country is located within North America, and "010" if the country is located in Asia), bits representing the land size of the country, bits representing the population of the country, bits representing the type of government of the country, and bits representing major industries of the countries. In this example, the name of countries, the continental location of the countries and the major industries of the countries are encoded using a category coding scheme while the other data are encoded using a scalar coding scheme.

Some coding schemes may cascade multiple coding schemes or the preprocessing of data. Such coding schemes include a logarithmic coding scheme which converts input data into log values, and then encodes the log values to a distributed representation format using a scalar coding scheme.

A coding scheme also defines whether input data should be aggregated over a particular time interval. Either the preliminary analysis of data by the automated search engine 310 or the user input 312 may indicate that spatial patterns or temporal sequences are likely to be identifiable if the data was aggregated over particular time intervals. In such cases, the automated search engine 310 may indicate a time aggregation to be performed as part of a coding scheme, and an encoder may perform the time aggregation on data field entries as indicated by the coding scheme. The aggregation may be performed using different methods (e.g., summing, averaging, or multiplying values in data entries) depending on the nature of the data. The time interval for aggregation may be uniform or unequal depending on the application and the nature of input data.

Figure 9:
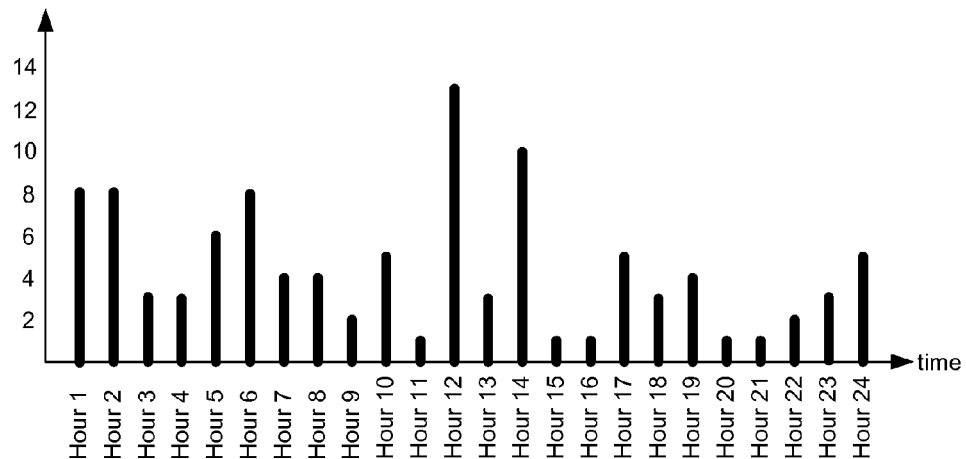
FIG. 9 is a graph illustrating data values over an example time frame, according to one embodiment.
Figure 10:
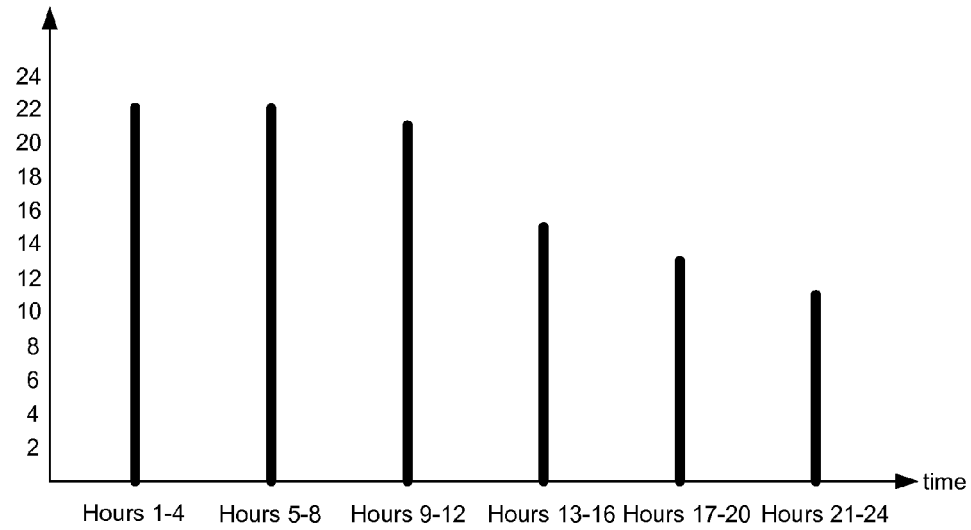
FIG. 10 is a graph illustrating aggregated data values of the time frame of FIG. 9, according to one embodiment.

FIG. 9 is a graph illustrating the number of purchases made hourly over a day. For example, in hour 2, 8 purchases were made and in hour 17, 5 purchases were made. FIG. 10 is a graph illustrating the number of purchases made in 4-hour time periods over a day for the same data set as FIG. 9, according to one embodiment. A STMS using data aggregated over the 4-hour time periods may identify the general trend (e.g., decreasing purchases over time) which could not be identified in data that are not aggregated over time. By varying time aggregations, various spatial patterns or temporal sequences may be identified by STMSs that would otherwise be unidentifiable or difficult to identify.

As described above with reference to FIG. 5, the automated search engine 310 is responsible for selecting or creating a coding scheme for each encoder 320. Specifically, the configuration module 540 of the automated search engine 310 analyzes various factors such as the user input 312, the initial configuration information 516 and the performance data 525 of previous experiments to determine coding schemes for a subsequent round of experiments. User input 312 may indicate a user preference of a particular coding scheme or certain processing node parameters (e.g., the use of a category coding scheme or a scalar coding scheme and time aggregation parameters).

Initial configuration information 516 is generated as result of the preliminary analysis by the data analysis module 530 taking into account data types in the data fields of the database 304, the general range of values in certain data fields of the database 304, and the distribution or trend of fluctuation in the data values in the data fields of the database 304. Initial configuration information 516 may also indicate the preprocessing of data before the conversion to a distributed representation form, such as: (i) the conversion of integer values to floating point values, (ii) the identification of data corresponding to the data entries of the database 304 using a look-up table, (iii) the multiplication by a scalar value, and (iv) the application of a function or transform to the data (e.g., a linear, logarithmic, or dampening function, or a Fourier transform) to change the range of data values. Alternatively, the configuration module 540 may store and use default coding schemes for an initial round of experiments without performing preliminary analysis.

Performance data 525 indicative of predictive performance of a STMS in a round of experiments may be taken into account to configure STMSs for further rounds of experiments. Various types of optimization algorithms may be used to improve configurations of STMSs over multiple rounds of experiments or to prematurely end experiments that do not look promising.

Example Functions and Operations of a Processing Node

Figure 11:
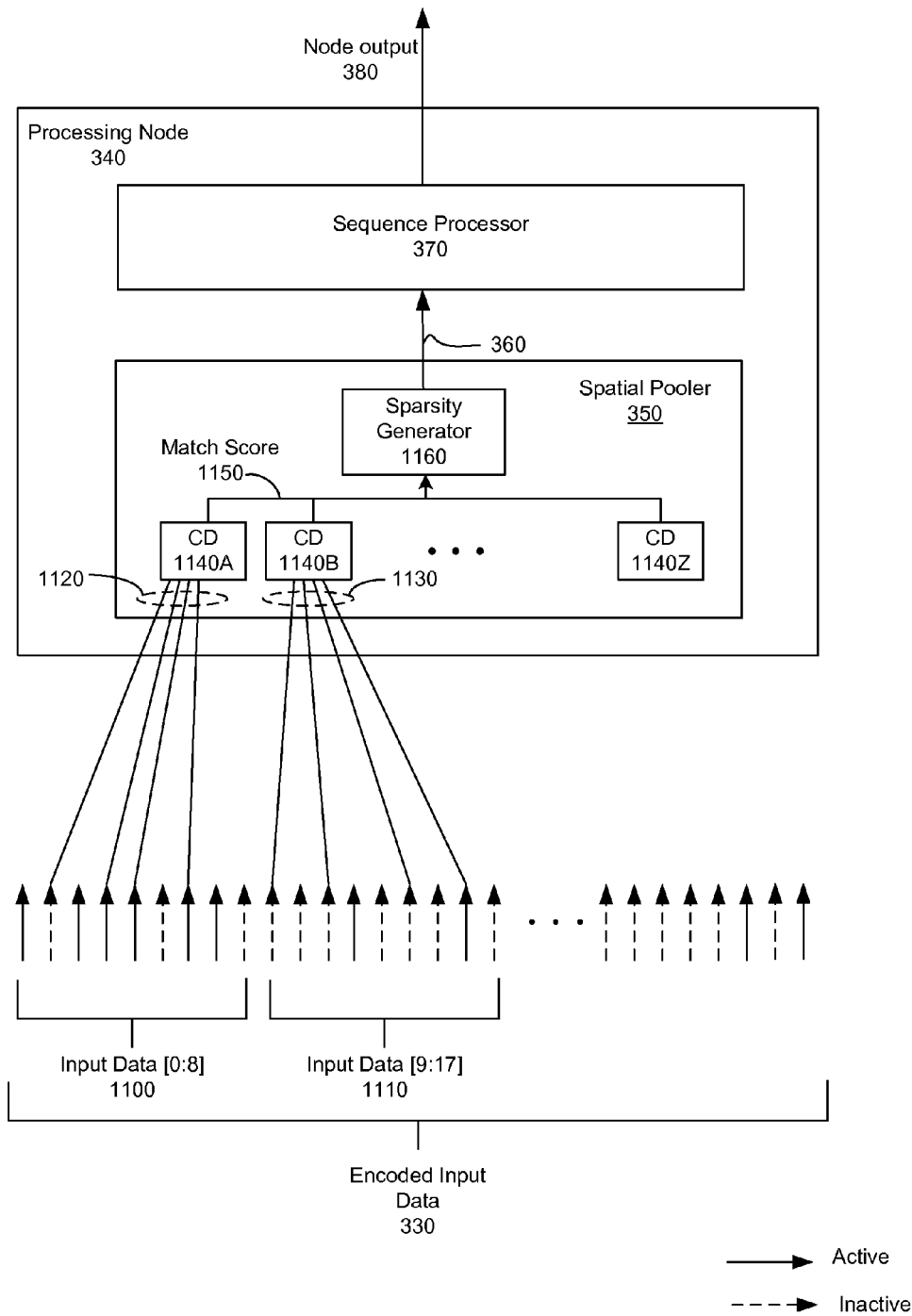
FIG. 11 is a block diagram illustrating a processing node of a STMS, according to one embodiment.

FIG. 11 is a block diagram illustrating a processing node 340 of a STMS, according to one embodiment. The functions and operations of the processing node 340 are described in further detail in the '464 application, and are briefly described herein for the sake of brevity. As shown in FIGS. 1 and 2, processing nodes 340 may operate as stand-alone nodes or may operate as part of a hierarchy of processing nodes to detect spatial patterns and temporal sequences, and to perform predictions or inference based on the learned patterns and temporal sequences.

The processing node 340 may include, among other components, a spatial pooler 350 and a sequence processor 370. The spatial pooler 350 receives encoded input data 330, performs spatial pooling, and outputs a sparse vector 360 to the sequence processor 370. The sparse vector 360 includes information about co-occurrences (stored spatial patterns that were learned from the data) detected in the encoded input data 330. The sequence processor 370 receives the sparse vector 360 from the spatial pooler 350, performs temporal processing, and outputs a node output 380. The node output 380 includes information on the detected temporal sequences of spatial patterns and the prediction of temporal sequences in the encoded input data 330.

Spatial pooling is the process of forming a sparse distributed representation from a distributed input pattern. The output bits of the spatial pooler are learned common co-occurrences of input bits. Referring to FIG. 11, the spatial pooler 350 may include, among other components, a sparsity generator 1360 and a plurality of co-occurrence detectors (CDs) 1140A through 1140Z (hereinafter referred to as "CDs 1140"). In one embodiment, each CD 1140 is mapped to a subset of elements in the encoded input data 330. As illustrated in FIG. 11 by lines extending from the CD 1140A to a subset 1120 of arrows representing input data bits, the CD 1140A is mapped to receive a subset 1120 of elements from bits [0:8] of the encoded input data 330. Similarly, the CD 1140B is mapped to receive a subset 1130 of elements from bits [9:17] of the encoded input data 330. In order for the CDs 1140 and the spatial pooler 350 to operate, the encoded input data 330 is in a distributed representation form to indicate which of the elements in the encoded input data 330 are active and which are inactive. In FIG. 11 the input bits to each CD are shown as separate and non-overlapping subsets of the encoded input data 330. This is for clarity only. Generally, the input bits to each CD are overlapping and intermixed.

The CDs 1140 detect similarity between the spatial patterns of the received subset of elements of the encoded input data 330 and the stored spatial patterns (i.e., co-occurrences), and generate match scores 1350 indicating the degree of detected similarity. In one embodiment, a higher match score indicates greater overlap between the subset of elements of the encoded input data 330 and the associated co-occurrences of each CD 1140. The match scores 1150 are provided to the sparsity generator 1360. In response, the sparsity generator 1160 generates the sparse vector 360 in a sparse distributed representation form.

The sparsity generator 1160 collects the match scores 1350 from the CDs 1140, and selects a number of CDs 1140 based on their match scores and the match scores of nearby CDs 1140 that satisfy conditions to generate the sparse vector 360. In one embodiment, when a CD becomes dominant (i.e., the CD has a high match score), the CD inhibits the selection of other CDs within a predetermined range (hereinafter referred to as "an inhibition range"). The inhibition range may extend only to CDs immediately adjacent to the dominant CD or may extend to CDs that are separated from the dominant CD by a predetermined distance. Alternatively, the sparsity generator 1160 may select a subset of CDs with the highest match scores among all CDs in the processing node.

In one embodiment, the sparse vector 360 may contain one vector element for each CD 1140. In this embodiment, if a CD is selected by the sparsity generator 1160, the vector element associated with the CD becomes active. For example, if the spatial pooler 350 contains ten CDs 1140, and the sparsity generator 1160 selects the first CD and the fourth CD based on the associated match scores 1150, the sparse vector 360 is (1, 0, 0, 1, 0, 0, 0, 0, 0, 0), where the first and fourth elements are one but other elements are zero. The density (or sparsity) of the sparse vector 360 representing the ratio of selected CDs among all CDs 1340 is governed by the inhibition range and the match score selection threshold value. In another embodiment the CDs output a scalar value and each element in the output 360 of the sparsity generator 1160 is a scalar.

As the inhibitory range of a dominant CD increases, the density of the sparse vector 360 decreases. Further, as the selection threshold value increases, the density of the sparse vector 360 increases. Conversely, as the inhibitory range of a dominant CD decreases, the density of the sparse vector 360 increases. Also, as the selection threshold value decreases, the density of the sparse vector 360 decreases. The combination of the inhibitory range and the selection threshold value maintains the density (or sparsity) of the sparse vector 360 within a certain range. Alternatively, a fixed number of CDs may be selected from all CDs 1340 based on the match scores 1350.

Figure 12:
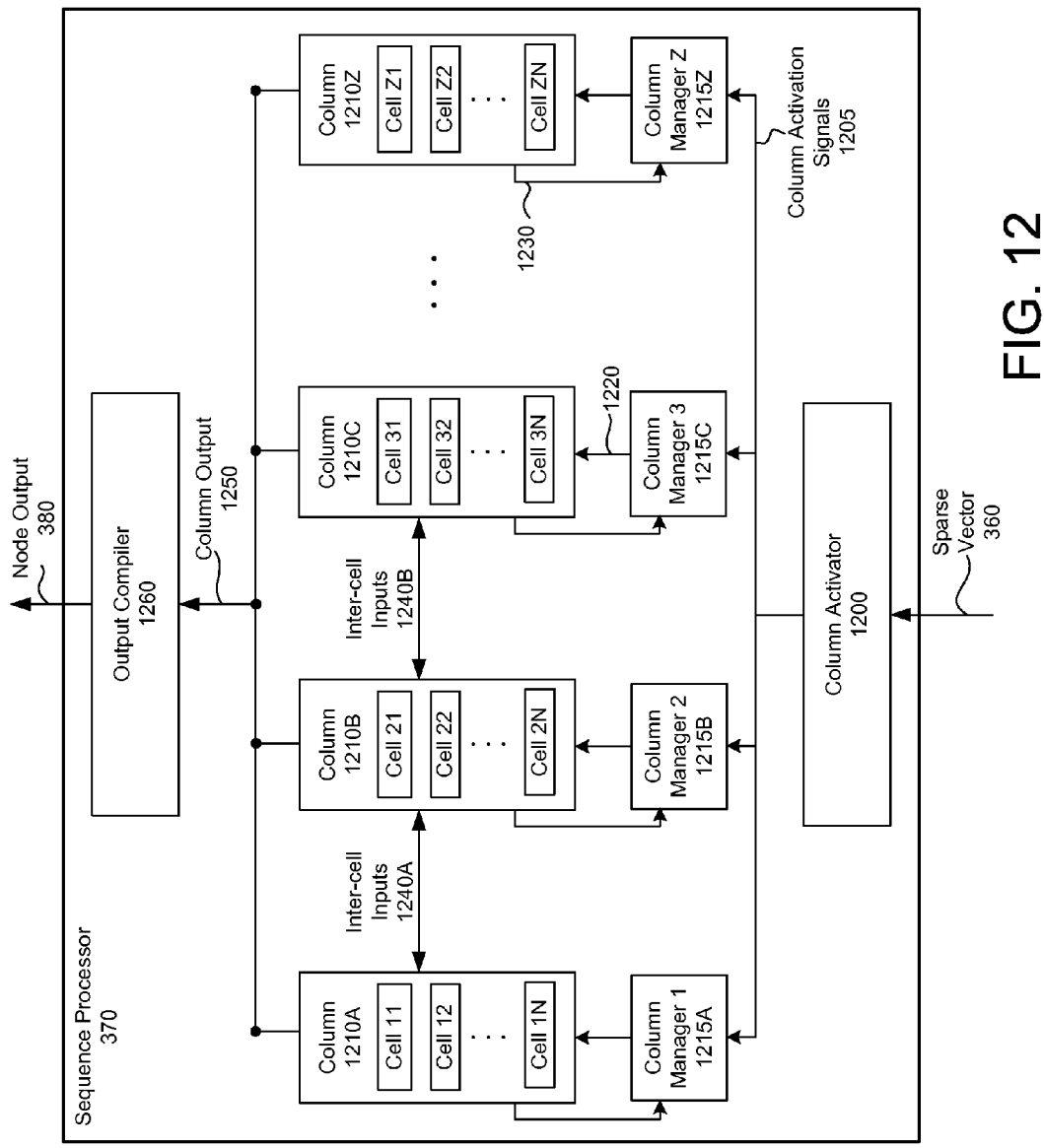
FIG. 12 is a block diagram illustrating a sequence processor of a STMS, according to one embodiment.

FIG. 12 is a block diagram illustrating a sequence processor 370 of a processing node, according to one embodiment. The sequence processor 370 may include, among other components, a column activator 1200, column managers 1215A through 1215Z (hereinafter collectively referred to as "column managers 1215") coupled to columns 1210A through 1210Z (hereinafter collectively referred to as "columns 1210"), and an output compiler 1260. The sequence processor 370 receives the sparse vector 360 from the spatial pooler 350, performs temporal processing, and outputs a node output 380. Temporal processing includes various time-based processing of sequential spatial patterns such as the recognizing, predicting or labeling of temporal sequences. The sequence processor 370 learns and stores the transitions between the spatial patterns as represented by the sparse vector 360. Based on the learned transitions, the sequence processor 370 recognizes and predicts subsequent sparse vectors 360.

The sequence processor 370 performs temporal processing by selectively activating cells (and columns 1210), and learning the previous states of cell activations. The cells learn to anticipate spatial patterns in the encoded input data 330 and activate before the corresponding spatial patterns actually appear in the encoded input data 330. When a cell becomes active, the cell sends out inter-cell inputs 1240 to other cells to indicate the activation state of the cell. A basic idea behind implementing temporal processing is to have a learning cell, upon activation, detect and store the identities of other active cells. The stored active cells may be currently active and/or may have been previously active. When a cell detects the activation of a threshold number of stored cells via inter-cell inputs 1240, the cell becomes active and the column 1210 containing the cell outputs an active column output 1250.

Based on the connections to other cells, a cell may be activated in advance before receiving column activation signals 1205 indicating a corresponding column to be activated, or a "prediction". In one embodiment, with exposure to repeated temporal sequences, the cells make connections to earlier activation states of other cells; hence, the cells become activate earlier in time and make longer term predictions. For each cell, the sequence processor 370 may tally a cell confidence score indicating how likely the advanced activation of the cell will be followed by a column activation signal. In one embodiment the confidence score is calculated by determining the percentage of times a predicted cell was followed by a column activation. A high confidence score indicates that early activation of the cell is very likely to be predictive of a corresponding spatial pattern whereas a low confidence score indicates that early activation of the cell was not as often followed by a corresponding spatial pattern.

In some embodiments, a column of the sequence processor 370 is activated when any cell in the column is activated. In such embodiments, a column confidence score may be adopted to indicate the predictive performance at the column level. The column confidence score indicates how likely the advanced activation of the column (based on early or predictive activation of any cells in the column) will be subsequently followed by a column activation signal indicating the activation of the cell.

The column activator 1200 receives the sparse vector 360 from the spatial pooler 350. In response, the column activator 1200 generates column activation signals 1205 indicating which columns to activate based on the sparse vector 360. Each column 1210 is connected to an associated column manager 1215 and contains a number of cells. Each column manager 1215 receives the column activation signal 1205, determines activation states of cells in the column (based on the activation signal 1205), and sends a select signal 1220 to activate one or more cells in the column 1210. The activated cells then learn a temporal sequence by making connections to active cells in other columns 1210 through inter-cell inputs 1240. Although not shown in FIG. 12, inter-cell inputs 1240 may exist between each pair of columns and even between cells in the same column. The column activator 1200 receives the sparse vector 360, determines which elements of the sparse vector 360 are active, and sends column activation signals 1205 to corresponding columns 1210 to activate these columns 1210. In one embodiment, the output compiler 1260 collects the outputs from the columns 1210 and concatenates these outputs as the node output 380.

Decoding of Node Output

The decoding of the node output 380 herein refers to converting the node output 380 into values or parameters predicted to be received at a corresponding STMS. The predicted values or parameters may be entry values for data fields in the database 304, values of the external data 605, or intermediate values or parameters generated at different stages of processing at a STMS. The decoding may be performed for various reasons, including for determining the accuracy of prediction at a STMS, as described in the section entitled "Performance Evaluation of a Spatial and Temporal Memory System," and for generating a prediction to be used by a person or program.

Decoding can be performed at different levels of STMS processing. The complete decoding of the node outputs 380 may be advantageous, for among other reasons, because errors or irregularities at the encoders 320 or the spatial poolers 350 will have less effect on the decoded data. Corruption of data and any inadequate processing by the encoders 320 or the spatial poolers 350 may be removed or reduced when the reverse processing of the encoders 320 and the spatial poolers 350 is performed. Complete decoding is also useful to output a prediction in the form of the original data. Partially decoding the node outputs 380 to the sparse vector 360 format (hereinafter referred to as a "sequence probability vector") or to the encoded input data 330 format (hereinafter referred to as a "predicted spatial pooler input") may also be performed. Partially decoding the node outputs 380 consumes less computing resources and can also be used to identify issues with the encoders 320 and the spatial poolers 350.

Figure 13:
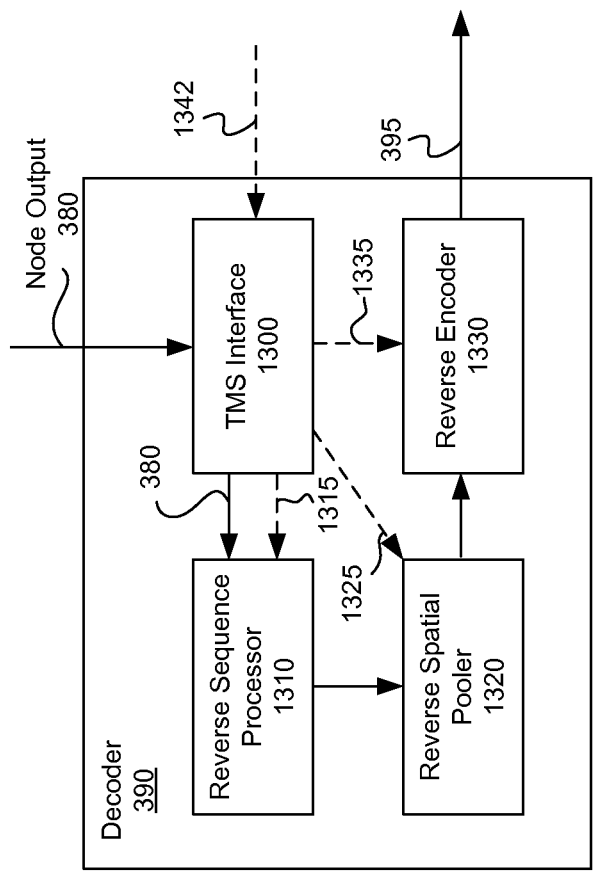
FIG. 13 is a block diagram illustrating a decoder of an automated search system, according to one embodiment.

FIG. 13 is a block diagram illustrating the decoder 390, according to one embodiment. The decoder 390 may include, among other components, a STMS interface 1300, a reverse sequence processor 1310, a reverse spatial pooler 1320, and a reverse encoder 1330. The STMS interface 1300 receives and caches the node output 380. The node output 380 includes predictions on input data to be subsequently received at the STMS. The STMS interface 1300 then forwards the node output 380 to the reverse sequence processor 1310 for processing. For simplicity, the decoder 390 will be described in terms of receiving a single node output 380 from a single processing module 340, but it should be noted that a decoder 390 may receive and decode node outputs 380 from any number of processing modules 340. In addition, although only one decoder 390 is illustrated in FIG. 3, any number of decoders 390 may be implemented in the automated search system 300. More than one decoder may be provided in the automated search system 300 to decode node outputs 380 from different STMSs.

In one embodiment, the STMS interface 1300 receives STMS information 1342 from the STMS whose node output 380 is being decoded. The STMS information 1342 includes information associated with the learned patterns and sequences at the STMS and the coding schemes for the encoder of the STMS. The STMS interface 1300 analyzes the STMS information and sends out the sequence processor information 1315, the spatial pooler information 1325, and the encoder information 1335 to the reverse sequence processor 1310, the reverse spatial pooler 1320 and the reverse encoder 1330, respectively. The sequence processor information 1315 may include, among other information, the sequence processor configuration parameters (e.g., the number of sequence processor cells and columns), the data stored in the temporal memory segments, and any other information related to the operation of the sequence processor 370. The spatial pooler information 1325 may include, among other information, the spatial pooler configuration parameters (e.g., the number of co-occurrence detectors), the mappings between CDs 1340 and the subsets of elements in the encoded input data 330, and any other information related to the operation of the spatial pooler 350. The encoder information 1335 may include, among other information, information related to the coding schemes and any other information related to the operation of the encoder 320. The sequence processor 1310, the reverse spatial pooler 1320 and the reverse encoder 1330 are configured accordingly to decode the node output 380.

Figure 14:
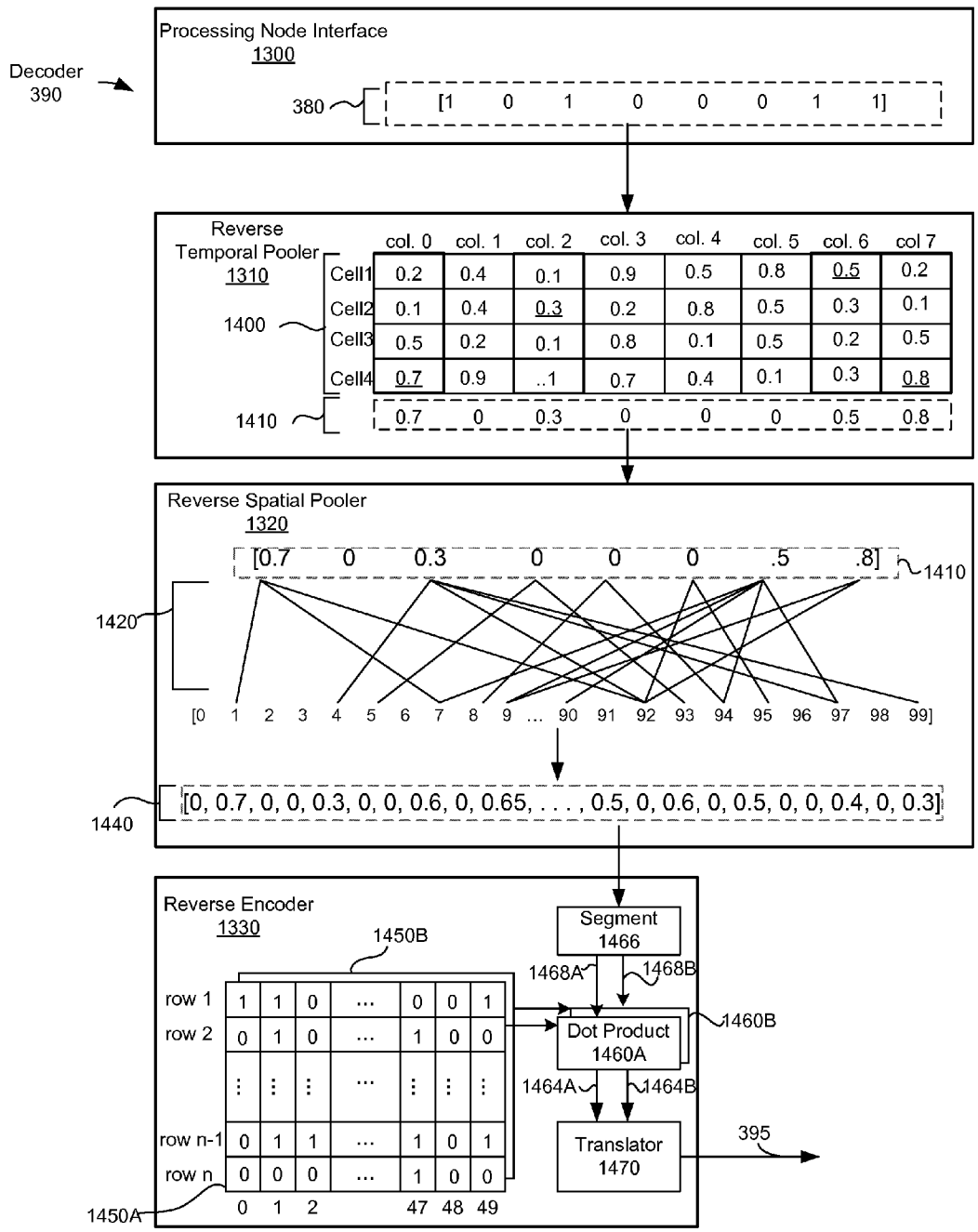
FIG. 14 is a conceptual diagram illustrating a process of decoding a node output, according to one embodiment.

FIG. 14 is a conceptual diagram illustrating a process of decoding the node output 380, according to one embodiment. In the example of FIG. 14, the decoder 390 decodes the node output 380 generated by a sequence processor of a processing node having 8 columns, each column including 4 cells. The reverse temporal pooler 1310 copies the same column and cell structure of the counterpart processing node. Hence, the reverse temporal pooler 1310 also has 8 columns, each column including 4 cells.

As described above with reference to FIG. 11, a cell confidence score indicates how likely the advanced activation of the cell will indeed be followed by a column activation signal in the sequence processor 370, indicating the activation of the column. For decoding, the confidence scores 1400 of cells are copied from the sequence processor 370 of a corresponding processing node and stored in the reverse temporal pooler 1310. In this example, a confidence scores takes a value not over 1 and not less than 0, and represents the percentage of time that the prediction of the cell output was accurate. For example, a confidence score of 0.7 indicates that the advanced activation of the corresponding cell in a column was followed by encoded input data activating the column 70% of the time.

In one embodiment, the reverse temporal pooler 1310 determines the highest cell confidence scores in the active columns and determines the sequence probability vector 1410. The sequence probability vector 1410 is similar to the sparse vector 360 fed to the sequence processor 370 in a processing node with the exception that the active elements in the sequence probability vector 1410 are represented in probability values rather than integer values of 1 or 0 to account for the fact that the sequence probability vector 1410 is a predicted sparse vector derived from the node output 380 rather than an actual sparse vector 360 generated from the encoded input data 330. Sequence probability vector 1410 is assembled by assigning the column confidence scores of active columns (having a "1" value in the corresponding elements of the node output 380) to the corresponding elements in the sequence probability vector 1410 while assigning a value of zero to the elements of the sequence probability vector 1410 corresponding to the inactive elements in the node output 380.

In the example of FIG. 14, the elements of the node output 380 associated with the columns 0, 2, 6 and 7 are active and the other active node elements are inactive. For the active columns, the highest cell confidence score for all cells in the column is taken as the column confidence score. For example, for column 0, cell 4 has the highest cell confidence score of 0.7, and hence, the column confidence score for column 0 is set to 0.7. For column 2, cell 2 has the highest confidence score of 0.3, and hence, the column confidence score for column 2 is set to 0.3. After determining the column confidence scores, the reverse temporal pooler 1310 generates the sequence probability vector 1410 by assigning the column confidence scores to elements corresponding to the active columns while assigning zeros to the inactive columns. In the example of FIG. 14, the sequence probability vector 1410 is (0.7, 0, 0.3, 0, 0, 0, 0.5, 0.8).

In an alternative embodiment, all cell confidence scores 1400 of a column are added or averaged to obtain a column confidence score of the same column instead of taking the highest cell confidence score of cells in the column.

The reverse spatial pooler 1320 receives the sequence probability vector 1410 and determines the predicted spatial pooler input 1440 based on the mappings 1420 between the elements of the sequence probability vector 1410 and the elements of the predicted spatial pooler input 1440. The predicted spatial pooler input 1440 is similar to the encoded input data 330 fed to the spatial pooler 350 except that the elements in the predicted spatial pooler input 1440 are represented in probability values rather than an integer value of 0 or 1 to account for the fact that the predicted spatial pooler input 1440 is a prediction of the encoded input data to the spatial pooler 350 rather than the actual encoded input data. The mapping between the elements of the sequence probability vector 1410 and the elements of the predicted spatial pooler input 1440 are the same as mappings between the CDs in the spatial pooler 350 and the encoded input data 330 (refer to FIG. 11).

One way of generating the predicted spatial pooler input 1440 is to assign an average value of the sequence probability vector elements mapped to a spatial pooler input element as the value for the same spatial pooler input element. Taking the example of the mapping 1420 in FIG. 14, bit [0] of the predicted spatial pooler input 1440 is not mapped to any non-zero elements of the sequence processor probability vector 1410. Hence, bit [0] of the predicted spatial pooler input 1440 takes a value of zero. Bit[1] of the predicted spatial pooler input 1440 is mapped only to the first element of the sequence processor probability vector 1410 (having a value of 0.7), and hence, the value of 0.7 is assigned to bit [1] of the predicted spatial pooler input 1440. Similarly, bit[4] of the predicted spatial pooler input 1440 is mapped only to the third element of the sequence probability vector 1410 (having a value of 0.3), and hence, the value of 0.3 is assigned to bit [4] of the predicted spatial pooler input 1440. On the other hand, bit[7] of the predicted spatial pooler input 1440 is mapped to both the first element (having value of 0.7) and the $99^{th}$ element (having value of 0.5) of the sequence probability vector 1410, and hence, the value of 0.6 (the average of 0.7 and 0.5) is assigned to bit [7] of the predicted spatial pooler input 1440. The reverse spatial pooler 1320 populates all the bits of the predicted spatial pooler input 1440 by averaging values of the elements in the sequence probability vector 1410 mapped to each bit of the predicted spatial pooler input 1440.

The reverse spatial pooler 1320 may apply functions other than the determining the average to elements of the sequence processor probable vector 1410 to produce elements of the predicted spatial pooler input 1440. In one embodiment, the reverse spatial pooler 1320 determines values for each element in the predicted spatial pooler input 1440 by taking the maximum value of the sequence processor probability vector elements mapped to the element of the predicted spatial pooler input 1440. Alternatively, the reverse spatial pooler 1320 may determine values for each element in the predicted spatial pooler input 1440 by taking the sum, the average or the median value of the sequence processor probability vector elements mapped to the element of the predicted spatial pooler input 1440. The reverse encoder 1330 receives the predicted spatial pooler input 1440 and produces the decoder output 395. The decoder output 395 will be a predicted version of the data 634. In one embodiment, the reverse encoder 1330 may include, among other components, a segment module 1466, one or more decoder tables 1450A and 1450B (hereinafter collectively referred to as "decoder tables 1450"), one or more dot product modules 1460A and 1450B (hereinafter collectively referred to as "dot product modules 1460"), and an input translator 1470. The segment module 1466, the decoder table 1450, the dot product module 1460 and the translator 1470 may be configured or instantiated based on the encoder information 1335 received at the reverse encoder 1330. The number of decoder tables 1450 and dot product modules 1460 may differ depending on the number of encoded data fields concatenated in a corresponding encoder.

When a corresponding encoder concatenates encoded vectors of multiple fields, the segment module 1466 segments the predicted spatial pooler input 1440 into multiple segments, each corresponding to a data field of the data 305 (or the external data 605). As described above with reference to FIG. 6, the distributed representation module 650 concatenates encoded data for each data field into the encoded input data 330. The segment module 1466 reverses this process and segments the predicted spatial pooler input 1440 into multiple segments. Taking the example of FIG. 14, a counterpart encoder of the decoder 390 receives two data fields of 50 bits each and concatenates the encoded data fields. The segment module 1466 splits the predicted spatial pooler input 1440 into the segments 1468A and 1468B and provides the segments 1468A and 1468B to the corresponding dot product modules 1460A and 1460B. If a corresponding encoder generates the encoded input data 330 for a single data field without concatenation with vectors of another field, then segmentation of the predicated spatial pooler input 1440 does not occur.

Each decoder table 1450 is used for decoding a segment of the predicted spatial pooler input 1440 corresponding to a data field. As set forth above in the section entitled "Coding Scheme Selection," each data field of the data 305 and/or the external data 605 is encoded in a different manner. The decoder table 1450 for each segment has a number of columns corresponding to the number of elements in the segment and a number of rows corresponding to each possible unique output data 330 that can be generated for a corresponding data field by a corresponding encoder 320

In one embodiment, each element in the decoder table 1450 has a binary value of 0 or 1. Referring to FIG. 6, the decoder table 1450 is obtained by copying mapping information (e.g., a mapping table) in the encoder 320, indicating the mapping between values of entries in a data field with a vector in a distributed representation format in the distributed representation module 650 (refer to FIG. 6). Each row of the decoder table 1450 represents an output vector of encoded input data produced at the distributed representation module 650 in response to receiving a data field value in the processed data 634 (or the aggregated data 644, or the extracted fields 602 and 604, depending on whether preprocessing or time aggregation is performed). In the example of FIG. 14, the decoder table 1450A has n rows and 50 columns. Hence, the distributed representation module 650 corresponding to the reverse encoder 1330 produces n discrete segments of the encoded input data 330, with each segment having 50 elements.

Each dot product module 1460 receives a segment of the predicted spatial pooler input 1440 and performs a dot product operation between a segment of the predicted spatial pooler input 1440 and each row of the decoder table 1450. Specifically, the dot product module 1460A computes dot product values for each row of the decoder table 1450A by performing dot product operations between the segment 1464A and the row of the decoder table 1460B. The dot product module 1460A then determines an index of the row 1464A that results in the highest dot product value. Similarly, the dot product module 1460B computes dot products values for the rows of the decoder table 1450B and the segment 1464B, producing an index of the row 1464B that results in the highest dot product value. The dot product modules 1460A, 1460B then send the selected table row indices 1464A and 1464B to the translator 1470.

The translator 1470 receives the row indices 1464A and 1464B, identifies the values corresponding to the indices 1464A and 1464B, and produces a decoder output 395. In one embodiment, the translator module 1470 outputs a decoder table row index as the decoder output 395. In one embodiment, the translator 1470 retrieves the data values corresponding to the received row indices. Such data values represent the predicted values of the data fields fed to the encoder of a corresponding STMS. For example, the encoder 320 receives a scalar value (e.g., 85.27), and encodes the scalar value to an encoded data input segment (e.g., (1, 0, 0, 1, 1, 0, 1)). In this example, a decoder table of a corresponding decoder contains a row with a vector corresponding to the encoded data input segment (e.g., (1, 0, 0, 1, 1, 0, 1)). If the value predicted by the STMS is the same or a similar scalar value (e.g., 85.27), the dot product value for a row (e.g., the $5^{th}$ row) corresponding to the similar scalar value (e.g., 85.27) results in the highest dot product value. The input translator 1470 then identifies the scalar value (e.g., 85.27) by determining a value corresponding to the row (e.g., the $5^{th}$ row). The translator 1470 may output any format of the data value as part of the decoder output 395.

In one embodiment, the translator 1470 determines and outputs a range of values for a decoding table row index. For example, if an encoder table has n rows, each representing a range of x, the translator 1470 generates (i) data values between 0 and x in response to receiving a first row index, (ii) data values between x and 2x in response to receiving a second row index, and so forth. Alternatively, the translator 1470 may output midpoint values of the range, values determined by a predetermined function, or a random value within the range.

Figure 15:
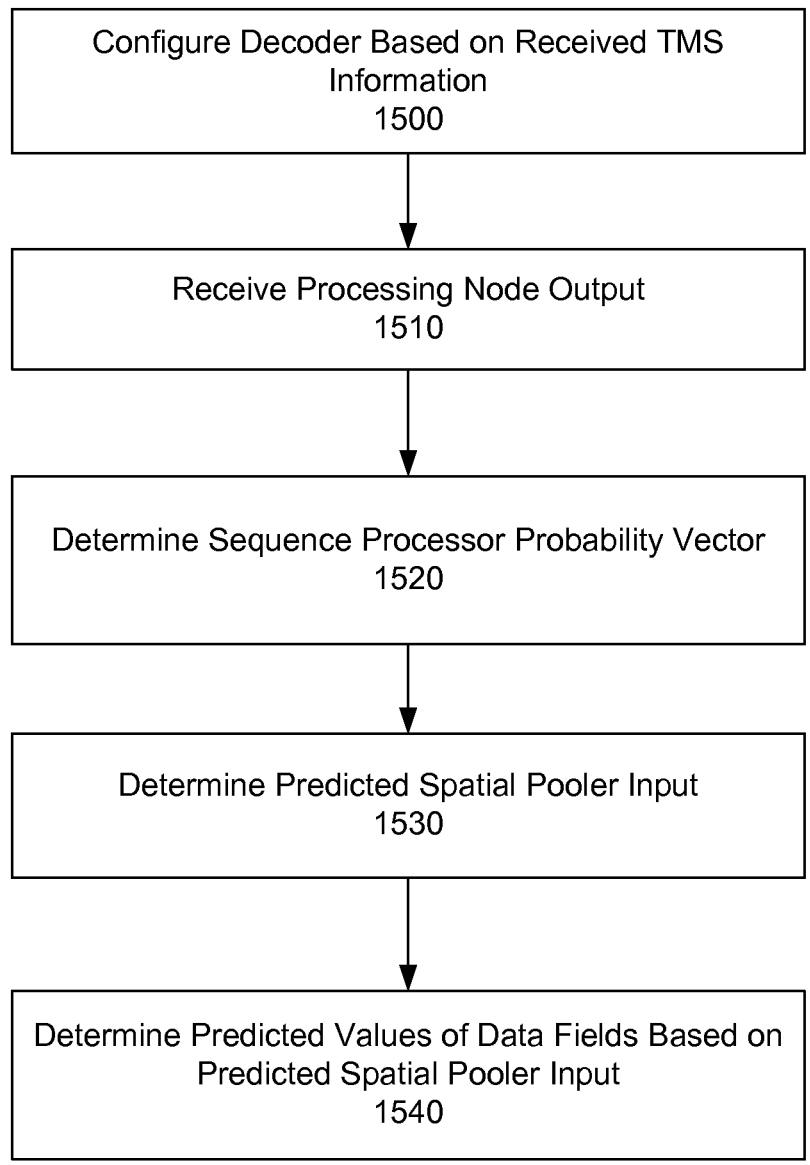
FIG. 15 is a flowchart illustrating a process of decoding a processing node output, according to one embodiment.

FIG. 15 is a flowchart illustrating a process of decoding a processing node output 380, according to one embodiment. The STMS interface 1300 receives STMS information 1342 from a STMS and configures 1500 the decoder 390 to decode the node output 380. Specifically, the STMS interface 1300 generates and outputs the sequence processor information 1315, the spatial pooler information 1325, and the encoder information 1335 to the reverse sequence processor 1310, the reverse spatial pooler 1320 and the reverse encoder 1330, respectively, and configures these components for decoding the node output 380.

The decoder 390 receives 1510 the node output 380 generated by the STMS at the STMS interface 1300. The reverse temporal pooler 1310 determines 1520 the sequence probability vector 1410 by analyzing the cell confidence scores of the columns indicated as being active by the node output 380.

The reverse spatial pooler 1320 then processes 1530 the sequence probability vector 1410 and outputs the predicted spatial pooler input 1440. The reverse encoder 1330 determines 1540 the predicted values of the data fields based on the predicted spatial pooler input 1440. Specifically, the segment module 1446 divides up the predicted spatial pooler input 1440 into multiple segments 1468A and 1468B corresponding to each data field. The dot product operations are performed on the multiple segments 1468A and 1468B at the dot product modules 1460A and 1460B using the decoder tables 1450A and 1450B to determine the indices of rows having the highest dot product values. The indices 1464A and 1464B are sent to the translator 1470 where corresponding values of the predicted data fields are determined based on the indices 1464A and 1464B.

The process of FIG. 15 is merely illustrative. Some of the steps, such as the configuring 1500 and the receiving 1510 steps, can be performed in parallel. Further, additional steps may be performed to verify the accuracy of the decoding at various levels or to enhance the performance of the decoder 390.

Although the embodiments described above with reference to FIGS. 13 through 15 fully decode the node output 380 to the format of the data fields received at a corresponding STMS, partial decoding may be performed to produce the sequence probability vector 1410, the predicted spatial pooler input 1440 or any other information derived therefrom as the decoder output 395.

Performance Evaluation of a Spatial and Temporal Memory System

The predictive performance of a STMS may be evaluated in various ways. One way of evaluating the predictive performance is to decode the node output 380 of a STMS, and compare the decoded node output with input data subsequently received at the STMS. The decoded node output may be in the form of the decoder output 395, described above in detail with reference to FIGS. 13 and 14.

Figure 16:
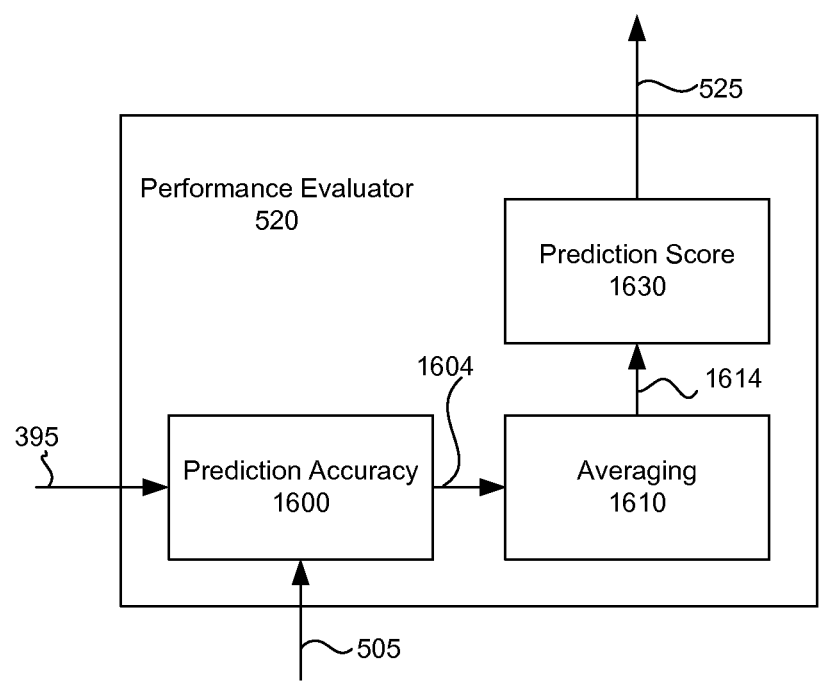
FIG. 16 is a block diagram illustrating a performance evaluator in an automated search engine, according to one embodiment.

FIG. 16 is a block diagram illustrating the performance evaluator 520 in an automated search engine 300, according to one embodiment. One of the many functions of the performance evaluator 520 is to compare the decoder output 395 and the raw input data 505 to determine the performance data 525. As discussed above with reference to FIG. 5, the configuration module 540 receives the performance data 525 and selects a coding scheme based on the performance data 525.

The performance evaluator 520 may be one of many components in the automated search engine 310 as illustrated in FIG. 5, or the performance evaluator 520 may operate as a stand-alone module. The performance evaluator 520 may include, among other components, a prediction accuracy module 1600, an averaging module 1610, and a prediction score module 1630. The prediction accuracy module 1600 receives and performs a comparison between the decoder output 395 and the raw input data 505, and outputs the result of the comparison 1604 to the averaging module 1610. The raw input data 505 represents the fields of data from the database 304 or the external data source 510 that appear in a subsequent entry or time relative to the data 305. That is, the decoder output 395 represents a prediction of future raw input data 505. By comparing the decoder output 395 and the raw input data 505, the predictive performance of the STMS can be determined.

The averaging module 1610 tracks the comparison result 1604, computes the average score 1614 of the prediction based on the comparison result 1604, and sends the computed average score 1614 to the prediction score module 1630. The prediction score module 1630 further processes or formats the averaged score 1614 to generate the performance data 525. The processing performed at the prediction score module 1630 can normalize the average scores for different types of data being compared at the prediction accuracy module 1600 so that the performance of STMSs can be assessed in a consistent manner across data of different types and varying ranges.

In one mode of operation, the prediction accuracy module 1600 outputs a "0" if the decoder output 395 and the raw input data 505 are not identical, regardless of the degree of similarity between the decoder output 395 and the raw input data 505. Such a comparison scheme is applicable, for example, in cases where a category encoding scheme is used by the encoder 320. When a category encoder is used, the degree of difference in the data may not have a useful meaning. Hence, whether the decoder output 395 and the raw input data 505 are identical may be the sole factor in evaluating the predictive performance of a STMS using a category encoding scheme.

In another mode of operation, the prediction accuracy module 1600 outputs a result 1604 representing the similarity between the decoder output 395 and the raw input data 505. The differences may be represented in terms of percentages, in absolute terms, in logarithmic terms or in other suitable manners. When a scalar coding scheme is used for a data field, the similarity or difference between the decoder output 395 and the raw input data 505 has a useful meaning. That is, the difference between the decoder output 395 and the raw input data 505 is inversely related to the accuracy of the prediction of future input data. For a scalar coding scheme, the prediction accuracy module 1600 produces a value representing a difference between the decoder output 395 and the raw input data 505 as the comparison result 1604.

When the decoder output 395 represents a range of predicted values, the prediction accuracy module 1600 can generate a value representing the range (e.g., a median value or an average value) for comparison with the raw input data 505.

In one embodiment, the prediction accuracy module 1600 receives more than one decoder output 395 and corresponding raw input data 505 simultaneously, and performs multiple comparisons simultaneously.

In one embodiment, the prediction score module 2030 outputs the performance data 525 for more than one coding scheme. For example, the prediction score module 2030 outputs the prediction scores for two or more coding schemes based on a single comparison by the prediction accuracy module 1600, or outputs the prediction scores for two or more coding schemes based on running averages of the prediction accuracy for the two or more coding schemes.

Figure 17:
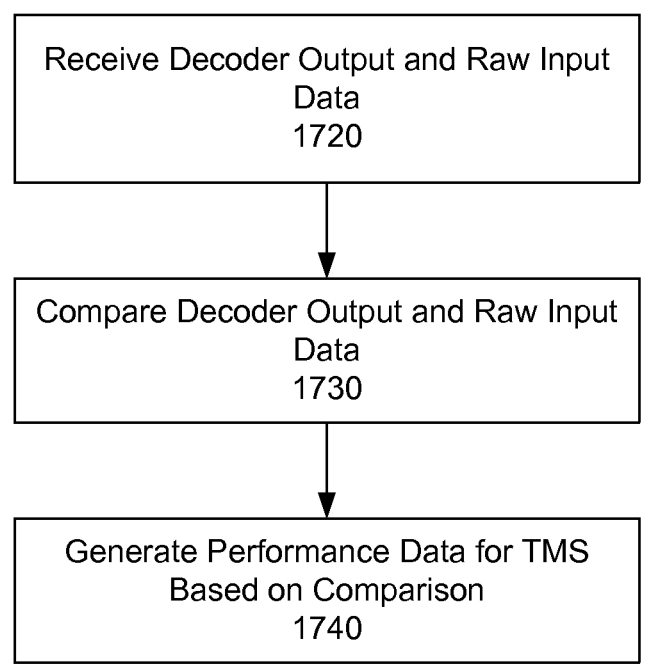
FIG. 17 is a flowchart illustrating a process of evaluating the performance of a STMS, according to one embodiment.

FIG. 17 is a flowchart illustrating a process of evaluating the performance of a STMS, according to one embodiment. The performance evaluator 520 receives 1720 the decoder output 395 and the raw input data 505. The performance evaluator 520 then compares 1730 the decoder output 395 and the raw input data 505. Based on the comparison results, the performance evaluator 520 generates 1740 the performance data 525. The process of generating the performance data 525 may include, among other steps, the averaging and the normalizing of values representing the comparison results.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method of searching for spatial patterns or temporal sequences of spatial patterns in input data, comprising:
generating a plurality of spatial and temporal memory systems according to configuration information;
providing a coding scheme to each spatial and temporal memory system, wherein each coding scheme identifies a subset of the input data and an encoding to encode the subset of the input data; and
identifying, at each spatial and temporal memory system, spatial patterns or temporal sequences of spatial patterns at the spatial and temporal memory system based on the subset of input data and the encoding identified by the coding scheme provided to the spatial and temporal memory system.

2. The method of claim 1, wherein one or more provided coding scheme further comprises a time aggregation, wherein spatial patterns or temporal sequences of spatial patterns are further identified at each spatial and temporal memory system based on the time aggregation.

3. The method of claim 1, further comprising:
analyzing a portion of the input data, wherein analyzing the portion of the input data comprises determining at least one of the input data types, the distribution of input data values and the range of input data values.

4. The method of claim 1, wherein providing a coding scheme to each spatial and temporal memory system comprises selecting a coding scheme based on at least one of: previously searched input data, previously provided coding schemes, analysis of the current input data, and user-selected parameters.

5. The method of claim 1, wherein the configuration information is selected based on at least one of: previously searched input data, previously generated spatial and temporal memory systems, analysis of the current input data, and user-selected parameters.

6. The method of claim 1, wherein searching for spatial patterns or temporal sequences of spatial patterns occurs independently of user input.

7. The method of claim 1, wherein searching for spatial patterns or temporal sequences of spatial patterns is based on user-selected time and money constraints.

8. The method of claim 1, wherein the spatial patterns and the temporal sequences of spatial patterns are identified by multiple computer processors operating in parallel.

9. The method of claim 1, further comprising:
evaluating the predictive performance of each spatial and temporal memory system; and
generating one or more updated spatial and temporal memory systems or providing one or more updated coding schemes to each spatial and temporal memory system based on the evaluated performance of the spatial and temporal memory systems.

10. The method of claim 9, wherein evaluating the predictive performance comprises determining, for each spatial and temporal memory system, a predicted spatial pattern based on an output of the spatial and temporal memory system, the output generated based on the spatial patterns or temporal sequences of spatial patterns identified at the spatial and temporal memory system.

11. The method of claim 9, further comprising:
ending the identification of spatial patterns or temporal sequences of spatial patterns by a spatial and temporal memory system based on the evaluated performance of the spatial and temporal memory system.

12. The method of claim 1, wherein generating the plurality of spatial and temporal memory systems further comprises:
determining operating parameters for at least one processing node in the spatial and temporal memory system.

13. The method of claim 1, wherein the input data is generated by combining or processing data from more than one data source.

14. The method of claim 1, wherein each spatial and temporal memory system further comprises an encoder configured to:
receive the coding scheme provided to the spatial and temporal memory system; and
encode the subset of input data identified by the coding scheme with the encoding identified by the coding scheme.

15. The method of claim 14, wherein the identified encoding is configured to cause the encoder to encode the identified subset of input data into a distributed representation format.

16. The method of claim 14, further comprising identifying, at each spatial and temporal memory system, spatial patterns or temporal sequences of spatial patterns in the subset of input data encoded by the encoder of the spatial and temporal memory system.

17. A system of searching for spatial patterns or temporal sequences of spatial patterns in input data, comprising:
a non-transitory computer-readable storage medium including executable computer modules comprising:
an automated search engine configured to:
generate a plurality of spatial and temporal memory systems according to configuration information; and
provide a coding scheme to each spatial and temporal memory system, wherein each coding scheme identifies a subset of the input data and an encoding to encode the subset of the input data; and
the plurality of spatial and temporal memory systems configured to identify, at each spatial and temporal memory system, spatial patterns or temporal sequences of spatial patterns at the spatial and temporal memory system based on the subset of input data and the encoding identified by the coding scheme provided to the spatial and temporal memory system; and
a processor configured to execute the computer modules.

18. The system of claim 17, wherein one or more provided coding scheme further comprises a time aggregation, wherein spatial patterns or temporal sequences of spatial patterns are further identified at each spatial and temporal memory system based on the time aggregation.

19. The system of claim 17, further comprising:
an evaluation module further configured to evaluate the predictive performance of each spatial and temporal memory system; and
the automated search engine further configured to generate one or more updated spatial and temporal memory systems or provide one or more updated coding schemes to each spatial and temporal memory system based on the evaluated performance of the spatial and temporal memory systems.

20. The system of claim 19, wherein evaluating the predictive performance comprises determining, for each spatial and temporal memory system, a predicted spatial pattern based on an output of the spatial and temporal memory system, the output generated based on the spatial patterns or temporal sequences of spatial patterns identified at the spatial and temporal memory system.

21. A non-transitory computer-readable storage medium storing executable computer program instructions for searching for spatial patterns or temporal sequences of spatial patterns in input data, the instructions comprising instructions for:
generating a plurality of spatial and temporal memory systems according to configuration information;
providing a coding scheme to each spatial and temporal memory system, wherein each coding scheme identifies a subset of the input data and an encoding to encode the subset of the input data; and
identifying, at each spatial and temporal memory system, spatial patterns or temporal sequences of spatial patterns at the spatial and temporal memory system based on the subset of input data and the encoding of input data identified by the coding scheme provided to the spatial and temporal memory system.

22. The non-transitory computer-readable storage medium of claim 21, wherein one or more provided coding scheme further comprises a time aggregation, wherein spatial patterns or temporal sequences of spatial patterns are further identified at each spatial and temporal memory system based on the time aggregation.

23. The non-transitory computer-readable storage medium of claim 21, further comprising instructions for:
evaluating the predictive performance of each spatial and temporal memory system; and
generating one or more updated spatial and temporal memory systems or provide one or more updated coding schemes to each spatial and temporal memory system based on the evaluated performance of the spatial and temporal memory systems.

* * * * *